(12) United States Patent
Stroz

(10) Patent No.: US 11,522,836 B2
(45) Date of Patent: Dec. 6, 2022

(54) DETERMINISTIC CONTAINER-BASED NETWORK CONFIGURATIONS FOR AUTONOMOUS VEHICLES

(71) Applicant: UATC, LLC, San Francisco, CA (US)

(72) Inventor: Glenn Paul Stroz, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 342 days.

(21) Appl. No.: 16/824,258

(22) Filed: Mar. 19, 2020

(65) Prior Publication Data
US 2021/0266295 A1 Aug. 26, 2021

Related U.S. Application Data

(60) Provisional application No. 62/981,307, filed on Feb. 25, 2020.

(51) Int. Cl.
*H04L 9/40* (2022.01)
*H04L 67/12* (2022.01)

(52) U.S. Cl.
CPC .......... *H04L 63/0263* (2013.01); *H04L 67/12* (2013.01)

(58) Field of Classification Search
CPC ............................. H04L 63/0263; H04L 67/12
See application file for complete search history.

(56) References Cited

U.S. PATENT DOCUMENTS

| | | | | |
|---|---|---|---|---|
| 10,562,496 B1 * | 2/2020 | Elangovan | ............... | B60R 25/24 |
| 10,944,691 B1 * | 3/2021 | Raut | ........................ | H04L 45/64 |
| 11,159,366 B1 * | 10/2021 | Gawade | ............... | H04L 41/0895 |
| 2012/0101680 A1 * | 4/2012 | Trepagnier | .............. | G01S 17/86 |
| | | | | 701/25 |
| 2013/0282238 A1 * | 10/2013 | Ricci | ........................ | H04L 67/12 |
| | | | | 701/99 |
| 2016/0246869 A1 * | 8/2016 | Gadamsetty | ...... | G06F 16/24573 |
| 2017/0118244 A1 * | 4/2017 | Bai | ...................... | H04L 63/0263 |
| 2017/0366616 A1 * | 12/2017 | Rodrigues Nascimento | ............... | |
| | | | | H04L 67/10 |
| 2018/0150083 A1 * | 5/2018 | Izadian | ................ | G05D 1/0255 |

(Continued)

OTHER PUBLICATIONS

Container Networking Interface software, https://github.com/containernetworking/cni.

(Continued)

*Primary Examiner* — Javier O Guzman
(74) *Attorney, Agent, or Firm* — Dority & Manning, P.A.

(57) ABSTRACT

Systems and methods for operating autonomous vehicle devices in a network according to a network configuration are discussed. The network can include a plurality of pods configured to run on the one or more host computing devices. The network can include one or more containers encapsulated by each of the plurality of pods. The network can include one or more communication links configured to provide communications among the plurality of network devices. For instance, the one or more communication links can include one or more intranetwork links configured to provide communication between the plurality of pods. The network can include a firewall comprising one or more firewall rules. The one or more firewall rules can be configured to allow communications along the one or more communication links and block communications along some or all connections other than the one or more communication links.

20 Claims, 10 Drawing Sheets

(56) References Cited

U.S. PATENT DOCUMENTS

| | | | |
|---|---|---|---|
| 2019/0098037 A1* | 3/2019 | Shenoy, Jr. | H04L 63/1425 |
| 2019/0297114 A1* | 9/2019 | Panchalingam | H04L 63/20 |
| 2020/0073692 A1* | 3/2020 | Rao | G06F 9/5077 |
| 2021/0097783 A1* | 4/2021 | Soltani Bozchalooi | G07C 5/0808 |

OTHER PUBLICATIONS

Kevin Sookocheff, "A Guide to the Kubernetes Networking Model", Jul. 11, 2018, https://sookocheff.com/post/kubernetes/understanding-kubernetes-networking-model/, retrieved on Mar. 18, 2020, 18 pages.

Linux Journal, "Understanding Firewalld in Multi-Zone Configurations", Feb. 2, 2017, https://www.linuxjournal.com/content/understanding-firewalld-multi-zone-configurations, retrieved on Mar. 18, 2020, 12 pages.

Objectif Libre, "Kubernetes Networks Solution Comparison", Jul. 5, 2018, https://objectif-libre.com/en/blog/2018/07/05/k8s-network-solutions-comparison/, retrieved on Mar. 18, 2020, 11 pages.

* cited by examiner

DETERMINISTIC CONTAINER-BASED NETWORK CONFIGURATIONS FOR AUTONOMOUS VEHICLES

RELATED APPLICATION

The present application is based on and claims benefit of U.S. Provisional Patent Application No. 62/981,307 having a filing date of Feb. 25, 2020, which is incorporated by reference herein.

FIELD

The present disclosure relates generally to autonomous vehicles. More particularly, the present disclosure relates to networking of computing devices configured to operate an autonomous vehicle.

BACKGROUND

A vehicle can be used to provide transportation in one or more different contexts. An autonomous vehicle is a vehicle that is capable of sensing its environment and navigating with minimal or no human input. In particular, an autonomous vehicle can observe its surrounding environment using a variety of sensors and identify an appropriate path through such surrounding environment.

An autonomous vehicle can include one or more computing devices configured to operate the autonomous vehicle. For instance, the computing devices can implement services operable to perform one or more functions related to operation of the autonomous vehicle, such as, but not limited to, navigation services, user safety and/or comfort functions, communication services, etc.

SUMMARY

Aspects and advantages of embodiments of the present disclosure will be set forth in part in the following description, or can be learned from the description, or can be learned through practice of the embodiments.

One example aspect of the present disclosure is directed to an autonomous vehicle system operable to control an autonomous vehicle. The autonomous vehicle system includes a plurality of network devices arranged in a network according to a network configuration. The plurality of network devices include one or more host computing devices and one or more system devices. The autonomous vehicle system includes one or more non-transitory computer-readable media that collectively store instructions that, when executed, operate the plurality of network devices according to the network configuration. The network includes a plurality of pods configured to run on the one or more host computing devices, one or more containers encapsulated by each of the plurality of pods, and one or more communication links configured to provide communications among the plurality of network devices. The one or more communication links include one or more intranetwork links configured to provide communication between the plurality of pods. The network can include a firewall comprising one or more firewall rules configured to allow communications along the one or more communication links and block communications along some or all connections other than the one or more communication links.

Another example aspect of the present disclosure is directed to one or more non-transitory computer-readable media that collectively store instructions operable to generate a network configuration for a network having a plurality of network devices including one or more host computing devices and one or more system devices. The network includes a plurality of pods configured to run on the one or more host computing devices, one or more containers encapsulated by each of the plurality of pods, one or more communication links configured to provide communications among the plurality of network devices. The one or more communication links include one or more intranetwork links configured to provide communication between the plurality of pods. The network includes a firewall including one or more firewall rules that are configured to allow communications along the one or more communication links and block communications along some or all connections other than the one or more communication links.

Another example aspect of the present disclosure is directed to a computer-implemented method for configuring a network having a plurality of autonomous vehicle devices configured to operate an autonomous vehicle. In some embodiments, the method can include obtaining, at a computing system including one or more computing devices, network description data for the plurality of autonomous vehicle devices, generating, by the computing system, network configuration data based at least in part on the network description data, and configuring, by the computing system, the plurality of autonomous vehicle devices in the network according to the network configuration data. The network configuration data defines one or more pods configured to run on one or more host computing devices, one or more containers encapsulated by each of the one or more pods, one or more communication links configured to provide communications among the plurality of autonomous vehicle devices, and a firewall comprising one or more firewall rules. The one or more communication links include one or more intranetwork links configured to provide communication between the one or more pods. The one or more firewall rules are configured to allow communications along the one or more communication links and block communications along some or all links other than the one or more communication links.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
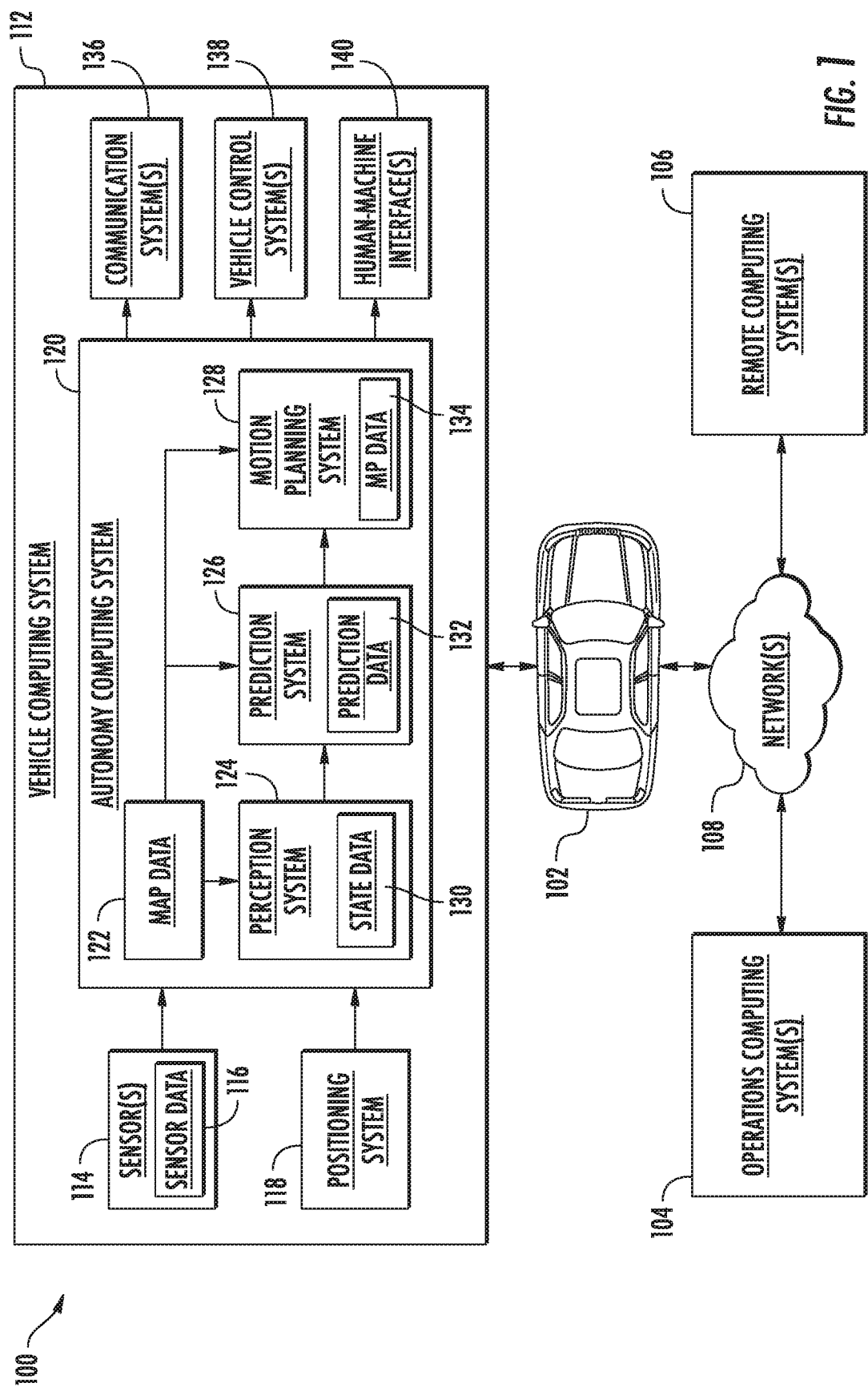
FIG. 1 depicts a block diagram of an example autonomous vehicle according to example embodiments of the present disclosure.

Generally, example aspects of the present disclosure are directed to compartmentalized network configurations for autonomous vehicles which enable communication between autonomous vehicle components such as network devices including host computing devices and/or system devices. For instance, the compartmentalized network configurations can be applied as part of a network architecture that is used to connect computing devices within an autonomous vehicle. The computing devices can implement or otherwise include various systems of an autonomous vehicle such as, for example, perception systems, prediction systems, motion planning systems, vehicle control systems, and/or combinations thereof. It is noted that other computer systems, components, and/or services of an autonomous vehicle can be configured with one or more compartmentalized network configurations in accordance with example embodiments of the present disclosure. The compartmentalized network configurations can be statically defined, such that the networks are not substantially modified, if at all, during operation of the autonomous vehicle. Additionally and/or alternatively, containers can provide a virtual operating environment for services, such as, but not limited to, services used to implement any of the various systems of an autonomous vehicles, within the compartmentalized network configuration. Access to containers and/or other portions of networks can be strictly regulated by a firewall such that only pre-authorized communication paths can be used in the network.

An autonomous vehicle (e.g., ground-based vehicle, aircraft, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, GPS, etc.), access map data associated with an environment external to the autonomous vehicle, and generate an appropriate motion plan through the vehicle's surrounding environment based on the sensor data and map data. In some implementations, the autonomous vehicle computing system can include a perception system, a prediction system, and a motion planning system that cooperate to perceive the surrounding environment of the autonomous vehicle and determine one or more motion plans for controlling the motion of the autonomous vehicle accordingly. The autonomous vehicle computing system can include one or more processors as well as one or more non-transitory computer-readable media that collectively store instructions that, when executed by the one or more processors, cause the autonomous vehicle computing system to perform various operations as described herein.

One or more network devices in an autonomous vehicle can be connected by a network. Typically, network arrangement and communications can be handled by dynamic networking protocols such as, for example, Dynamic Host Configuration Protocol (DHCP). Additionally and/or alternatively, network arrangement and communications can be handled by services such as Domain Name System (DNS) services or other services for automatically and/or dynamically resolving network communications, such as addressing (e.g., assigning IP addresses). While such systems can be widely beneficial, especially in the concept of so-called "cloud" networks, such systems can present problems in the context of networking within an autonomous vehicle.

For instance, in some cases, some networking protocols can be too permissive. For instance, many networking protocols allow and/or require communications between most or all devices in the network. For example, in cloud networking systems, services are often maintained as hardware-independent services and resolved to a service name. In this way, low-level details such as, for example, target runtime hosts, IP addresses, ports, etc. are typically abstracted out of the network. As such, it can be difficult to establish secure communication restrictions, as the low-level details can be unknown and/or inconsistent before and/or during operation. This can present problems with autonomous vehicle systems, which typically desire to minimize avenues for threats to communicate within and/or interact with the network. As another example, it can be desirable to monitor network traffic at various points in the network, which can be complicated by dynamic networking protocols.

Additionally and/or alternatively, some networking protocols can exhibit a tendency to break onboard functionality of an autonomous vehicle. Onboard functionality of an autonomous vehicle can refer to, for instance, functionality of an autonomous vehicle dependent largely on computations performed on one or more computing devices disposed on and/or within the autonomous vehicle. In some cases, for example, changes to offboard services such as, but not limited to, DNS and/or DHCP can break onboard functionality. Fixing this onboard functionality can undesirably involve updating software on the autonomous vehicle. Additionally and/or alternatively, dynamic addressing can contribute to increased difficulty with logging, debugging, and/or managing onboard systems.

Some networking and/or container protocols can contribute to increased overhead, which can be undesirable. For instance, many networking protocols employ a distributed key-value store, such as Kubernetes etcd, which can require a large amount of computing resources to evaluate. Additionally, having a persistent key store can pose a security risk, and can thus be undesirable.

According to example aspects of the present disclosure, a network, such as a network configured within an autonomous vehicle, can include a plurality of network devices. For instance, a plurality of network devices can be configured in a network according to a network configuration. A plurality of network devices can include, for example, one or more computing devices. For instance, a plurality of network devices can include one or more host computing devices. In some embodiments, a plurality of network devices can include one or more computing devices configured to implement operation systems within an autonomous vehicle, such as, for example, perception systems, inference systems, prediction systems, planning systems, and/or control systems, and/or combinations thereof.

Additionally and/or alternatively, a plurality of network devices can include one or more system devices. One or more system devices can be or include, for example, control devices, computing devices, and/or instrumentation devices configured to monitor and/or operate systems of an autonomous vehicle. For example, one or more system devices can include one or more sensors configured to sense and/or measure a condition of an autonomous vehicle and/or a scene associated with an autonomous vehicle. For example, one or more sensors can be or include cameras, LIDAR sensors, infrared sensors, speedometers, accelerometers, barometers, compasses, RADAR sensors, proximity sensors, and/or any other suitable sensors in accordance with example aspects of the present disclosure. As another example, one or more system devices can include control devices such as, but not limited to, braking devices, steering devices, safety devices, and/or any other suitable control devices.

One or more network devices can be configured to run one or more services. For instance, one or more host computing devices can be configured to run one or more services. One or more services can include, for example, computer-implemented processes for operation of an autonomous vehicle, such as, for example, perception services, inference services, prediction services, planning services, and/or control services, combinations thereof, and/or any other suitable services for operation of an autonomous vehicle. A network configuration can be provided to arrange the one or more services within the network.

According to example aspects of the present disclosure, a network can include one or more containers. One or more containers can contain one or more services. In some embodiments, a container is associated with a single service. One or more containers can provide an operation environment for one or more services. Additionally and/or alternatively, one or more containers can monitor and/or restrict communications to and from one or more services. In some embodiments, containers can be implemented according to a container protocol, such as, for example, CNI interface and/or CNI plugins.

For instance, a container can provide a virtual operation environment for a service. The container can be disposed on a host computing device having an amount of computing resources, such as, for example, memory including volatile and/or non-volatile memory, processing power (e.g., operations per second), or other suitable computing resources. The container can provide a virtual operation environment that allows the service to access a set (e.g., a subset) of the computing resources of the host computing device. Computing resources other than those provided by the container to the service can additionally and/or alternatively be hidden from the service. Additionally and/or alternatively, the container can provide virtual addresses (e.g., memory addresses) and/or dependencies for the service. In this way, the service can operate dependent only on the resources and/or dependencies of the virtual operation environment within the container, in addition to any communication with external services.

According to example aspects of the present disclosure, a network can include one or more pods. One or more pods can encapsulate one or more containers. For instance, one or more pods can each include one or more containers. One or more pods can be arranged on one or more host computing devices. For example, one or more host computing devices hosting one or more pods can be in communication to collectively operate an autonomous vehicle based at least in part on one or more containers encapsulated by the one or more pods. One or more pods can be configured to provide communication between one or more containers. For instance, one or more pods can encapsulate one or more containers, and communications between the one or more containers and/or an external element, such as another pod, system device, host computing device, external network, etc., can be provided with respect to the pods (e.g., as opposed to the one or more containers).

A network can include one or more communication links. For instance, one or more communication links can be defined between one or more pods arranged within a network. For example, the communication links can be defined between communication interfaces for two or more pods. Additionally and/or alternatively, one or more communication links can be system device links that are defined between a pod and a system device. Additionally and/or alternatively, one or more communication links can be defined between a pod and an external network (e.g., an external network computing device). It should be understood that a communication link can include any suitable element and/or enablement, or collection thereof, definitively and/or abstractly defined, used to facilitate communication over a pre-established path between network devices. For instance, a communication link can be or include any element or portion of an element used to facilitate communications among network devices, such as, but not limited to, routing table entries, firewall entries, physical connections (e.g., a wire), successfully executed handshake and/or acknowledgement protocols, and/or any other suitable indication and/or method for facilitating communications among network devices, and/or combination thereof. As used herein, a "communication" can refer to one or more instances of any of wired and/or wireless analog and/or digital communication within a computer medium. For instance, a communication can be or include at least a portion computer-readable data transmitted according to any of a number of wired and/or wireless communication protocols, such as, but not limited to, Ethernet protocols, LAN protocols (e.g., IEEE 802.11), LTE, TCP, UDP, or any other suitable protocol.

A network can include one or more communication interfaces. A communication interface can be configurable to establish a communication link between a pod and an external network device. For instance, an external network device can be, but is not limited to, another pod, such as another pod in the same host computing device and/or a different host computing device from the pod, another type of network device, such as, for example, a switch (e.g., a backplane switch), a system device (e.g., a sensor and/or control device), an external network (e.g., an offboard network device) or any other suitable external network device. In some embodiments, for example, a communication interface can include an address, such as a network address, (e.g., MAC address, IP address), port, socket, plug configured to receive a wired connection, and/or any other suitable communication interface, and/or combination thereof. In some embodiments, a communication interface can be implemented by software (e.g., a virtual address). As another example, a communication interface can be implemented in hardware (e.g., a wired connection interface).

A network device can have one or more network addresses associated with the network device. For instance, a host computing device can have one or more associated network addresses, such as one or more subnet addresses used to configure a subnet on the host computing device. Additionally and/or alternatively, a system device can have one or more associated network addresses, such as one or more network addresses used for communication interfaces. In some embodiments, one or more network addresses can be assigned to one or more pods configured on a host computing device based at least in part on one or more network addresses associated with the host computing device. For example, a host computing device can have an assigned subset of network addresses, and one or more pods configured on the host computing device can have addresses from the assigned subset of network addresses. In some embodiments, one or more network addresses can be associated with one or more communication interfaces. For instance, a host computing device can have a first communication interface (e.g., a first port) and a second communication interface (e.g., a second port) and a first network address can be associated with the first communication interface while a second network address is associated with the second communication interface. Additionally and/or alternatively, a same network address can be used for some or all communication interfaces associated with a host computing device.

A network can include a firewall. In some embodiments, a firewall can be a distributed firewall. For instance, in some embodiments, at least a portion of a distributed firewall can be enforced at each of one or more network devices. As another example, a firewall can be a centralized firewall. For example, a centralized firewall can monitor an entire network coverage area while running at a centralized location, such as, for example, a centralized service or process and/or a centralized host computing device. In some embodiments, a firewall can be implemented as software. In some embodiments, a firewall can be implemented in hardware. In some embodiments, a firewall can be at least partially software and/or at least partially hardware.

A firewall can include one or more firewall rules. One or more firewall rules can be configured to allow and/or block select communications within a network. For example, one or more firewall rules can be configured to allow and/or block select communications along one or more communication links, such as one or more communication links established between two or more communication interfaces. For instance, in some embodiments, one or more firewall rules can be configured to allow communications along one or more communication links, such as predefined communication links. Additionally and/or alternatively, one or more firewall rules can be configured to block communications that are not along one or more communication links, such as predefined communication links.

One or more firewall rules can be established at any point in a network. For instance, for a network including one or more predefined valid communication links, a firewall including one or more firewall rules can include one or more firewall rules defining source-destination pairs of communication interfaces to be allowed, wherein the firewall is configured to block communications with a source and/or a destination that do not correspond to the allowed source-destination pairs. As another example, a firewall can include one or more firewall rules defined for a particular network device and/or other network element, such as, for example, a pod. For example, one or more firewall rules defined for a particular network device can include one or more communication whitelists. For example, one or more firewall rules can include one or more communication whitelists corresponding to a whitelist of allowed sources and/or a whitelist of allowed destinations, which may be different lists and/or the same list. For instance, the one or more communication whitelists can include an exhaustive list of devices and/or communication interfaces that are allowed to send and/or receive communications with the network device. For instance, a communication whitelist can include an exhaustive list of valid communication interfaces, such as, for example, any of addresses (e.g., IP addresses), ports, device names and/or other authentication information, sockets, wired connection, and/or other suitable communication interface data, and/or combination thereof. A firewall can thus be configured to allow a communication only if a communication interface sourcing and/or receiving the communication at least partially, and/or completely, matches an entry on a communication whitelist.

In some embodiments, a firewall can reject a communication. For instance, a firewall can reject a communication by preventing propagation of at least a portion of the communication, such as a query from a source and/or a reply from a destination, handshake data, etc., such that either or both of the source and/or destination are unaware if the other received the communication. In some embodiments, a firewall can reject any and/or all communications that do not match a whitelisted communication link. In this way, a firewall can "shield" a network from unwanted communications. Additionally, a firewall can prevent unwanted communications from being used to determine information about a structure of a network. For example, a firewall can prevent attackers from sending communications to learn information corresponding to extant devices (e.g., IP addresses), such as by monitoring which devices respond to the communications at all, even if only by denying the communications. Additionally and/or alternatively, a firewall can "force" network devices to comply with a pre-established network configuration, which can be helpful in monitoring and/or optimizing traffic on the network, in addition to ensuring compliance with any system requirements.

In some cases, some aspects of a network configuration can be generally known prior to configuration of a network. For example, in some embodiments, one or more services and/or one or more containers can be known prior to configuration of a network. For example, it can be generally known that some set of services will be required for operation of an autonomous vehicle. Additionally and/or alternatively, it can be generally known which of one or more services will be encapsulated by containers and/or pods of containers. Additionally and/or alternatively, it can be generally known which of one or more services will need to communicate with which other of the one or more services. For example, one or more services can provide a list or other indication of their communication requirements within a network. In some embodiments, the list or other indication can be described generally, such as by, for example, service name, ID, or other identifier. It can be desirable to parse the set of services, set of containers and/or pods, and/or list or other indication of communication requirements into a network configuration.

For instance, in some embodiments, one or more computing systems can configure a network comprising a plurality of network devices, such as autonomous vehicle devices employed to collectively operate an autonomous vehicle. For instance, one or more computing systems can implement one or more computer-readable instructions defining one or more applications. The one or more applications can be operable to perform some or all of the steps of configuring a network according to example aspects of the present disclosure.

According to example aspects of the present disclosure, one or more computing systems can receive network description data which is generally descriptive of at least some aspects of a network. In some embodiments, network description data can include data describing one or more network devices, such as one or more host computing devices and/or one or more system devices. In other words, network description data can include data that, informally, describes any system-level information about a network, such as presence and/or arrangement of host computing devices and system devices. For instance, network description data can include data describing identification information (e.g., system name, unique identification number, etc.) associated with one or more host computing devices and/or system devices.

Additionally and/or alternatively, network description data can include data describing one or more communication interfaces associated with one or more network devices. For instance, network description data can include data enumerating network addresses, ports, sockets, etc. associated with one or more network devices. For example, network description data can include, for a host device, a list of connected devices, such as system devices and/or other host devices, that are connected to the host device, along with any information about addresses or ports used to communicate with the connected devices.

Additionally and/or alternatively, network description data can include data describing one or more network addresses associated with one or more network devices. For example, network description data can include data describing a network address associated with a network device. As another example, network description data can include data describing a network address subnet associated with a host computing device.

An example of network description data for an example pod according to example aspects of the present disclosure, is given below:
[Pod identifier]:
   Pod_address_allocation: [Address Subnet]
   devices:
     [Device 1]:
       [Attribute_1]: [Value 1]
       [Attribute_2]: [Value 2]
       ...
       [Attribute_N1]: [Value N]
     [Device 2]:
       [Attribute_1]: [Value 1]
       [Attribute_2]: [Value 2]
       ...
       [Attribute_N2]: [Value N]
     [Device K]
       [Attribute_1]: [Value 1]
       [Attribute_2]: [Value 2]
       ...
       [Attribute_Nk]: [Value N]

For instance, [Pod identifier] can include a field uniquely describing a pod with respect to a host computing device and/or an overall network. For example, [Pod identifier] can be an alphanumeric identifier, such as "P01" or "P02". As another example, [Address Subnet] can indicate one or more addresses to be assigned to the pod subnet on the pod. For example, the addresses subnet can include a root address and an indication of other addresses to be included. As one example, the address subnet can be formatted as root_address/address_bits, where address_bits defines the number of bits in an address (e.g., an IP address) to be used for the subnet, such that $2^{address\_bits}$ defines the number of addresses to be included in the subnet. Additionally and/or alternatively, [Device 1], [Device 2], etc. can be an identifier of any suitable system device such as, for example, a LIDAR, VIM, or any other suitable system devices. Attributes can be descriptive of any suitable attributes of the system devices. For example, attributes can include, but may not be limited to, addresses (e.g., IP addresses) and/or ports. For example, the attributes can at least partially collectively define a communication interface. Values of the attributes can be or can include, for example, one or more addresses (e.g., IP addresses) for an address attribute, one or more ports for a port attribute, or any other suitable values.

Additionally and/or alternatively, network description data can include data describing one or more external network components. For example, network description data can include data describing one or more offboard services and/or one or more communication interfaces associated with the offboard services. For example, network description data can include a list of offboard services, and, for each of the offboard services, one or more of addresses (e.g., IP addresses), ports, allowed transport methods (e.g., wired, fiber, wireless, cellular communications (e.g., LTE)), or other suitable communication interface data. An example of network description data for example offboard services is given below:
Offboard Endpoints:
   [Offboard Service 1]:
     [Attribute_1]: [Value 1]
     [Attribute_2]: [Value 2]
     ...
     [Attribute_N1]: [Value N]
   [Offboard Service 2]:
     [Attribute_1]: [Value 1]
     [Attribute_2]: [Value 2]
     ...
     [Attribute_N2]: [Value N]
   ...
   [Offboard Service K]
     [Attribute_1]: [Value 1]
     [Attribute_2]: [Value 2]
     ...
     [Attribute_Nk]: [Value N]

For example, [Offboard Service 1], [Offboard Service 2], etc. can be an identifier of any suitable offboard service such as, for example, a centralized service, vehicular fleet management service, or any other suitable offboard services. Attributes can be descriptive of any suitable attributes of the offboard services. For example, attributes can include, but may not be limited to, addresses (e.g., IP addresses), ports, and/or allowable transport types. For example, the attributes can at least partially collectively define a communication interface. Values of the attributes can be or can include, for example, one or more addresses (e.g., IP addresses) for an address attribute, one or more ports for a port attribute, indications of allowed transport types, such as a list of allowed transport types, or any other suitable values. As one example, a list of allowed transport types could define types such as wireless (e.g., LTE) and/or wired (e.g., fiberoptics).

Additionally and/or alternatively, network description data can include a skeleton network structure. In some embodiments, communication links in a skeleton network structure can be defined for unidirectional and/or bidirectional communications. Informally, the skeleton network structure can describe requirements of software modules on a network, such as services and/or communication systems, as described more particularly below.

In some embodiments, a skeleton network structure can include a set of services. In addition to and/or alternatively to a set of services, a skeleton network structure can include a set of containers and/or a set of pods. In some embodiments, a set of services and/or a set of containers and/or a set of pods can be defined generally (e.g., in terms of service name and/or ID, as opposed to device-level identifiers). In some embodiments, at least a portion of a set of services and/or a set of containers and/or a set of pods can include target runtime host computing devices for the portion of the set of services and/or set of containers and/or set of pods. For example, a target runtime host computing device can specify a host computing device that a service and/or container and/or pod will preferably and/or be required to run on during operation of a network. In some embodiments, a set of services can include, for each service in the set of services, an endpoint indication defining a service as an endpoint. For instance, an endpoint can be a service which requires communications with services outside of a pod and/or host computing device associated with the endpoint. For instance, in some embodiments, services and/or containers can be grouped within pods so that endpoint services can communicate with non-endpoint services, which can only require communications within the pod.

In some embodiments, a skeleton network structure can include a set of communication links within a network. For example, a skeleton network structure can include a set of communication links between a set of services and/or a set of one or more network devices, such as one or more system devices. For example, a service in a set of services can include a list of requested endpoints (e.g., other services the service needs to communicate with), and communication links (e.g., transmit links) can be defined between the service and each of the requested endpoints. As another example, a service can include a list of allowed accessors (e.g., other services allowed to access the service), and communication links (e.g., receive links) can be defined between the service and each of the allowed accessors. As another example, a service can include a list of communication interfaces, such as ports.

An example portion of a skeleton network structure according to example aspects of the present disclosure is given below:
Services:
 [Service 1]:
 hosts: [Host 1],
 endpoint_ports: [Port Identifier(s) 1]
 requested_endpoints: [Endpoint(s) 1]
 Allowed_accessors: [Accessor(s) 1]
 [Service 2]:
 hosts: [Host 2]
 endpoint_ports: [Port Identifier(s) 2]
 requested_endpoints: [Endpoint(s) 2]
 Allowed_accessors: [Accessor(s) 2]
 . . .
 [Service k]:
 hosts: [Host k]
 endpoint_ports: [Port Identifier(s) k]
 requested_endpoints: [Endpoint(s) k]
 Allowed_accessors: [Accessor(s) k]
For example, [Service 1], [Service 2], etc. can be any suitable service, including onboard services and/or offboard services. The [Host] fields can be or can include identifiers (e.g., unique identifiers) of host computing devices that are target host(s) for each service. The [Port Identifier(s)] fields can be or can include a listing of any ports that are used by the services. For example, the port identifier fields can include a tuple of communication protocol and numerical port (e.g., [protocol]: #). The [Endpoint(s)] fields can be or can include identifiers of any endpoints (e.g., other services, system devices, etc.) with which the service is allowed to send communications. The [Accessor(s)] fields can be or can include identifiers of any endpoints (e.g., other services, system devices, etc.) that the service is allowed to receive communications from.

According to example aspects of the present disclosure, one or more computing devices can generate network configuration data based at least in part on network description data. For example, network configuration data can include one or more sets of computer-readable instructions that, when implemented, cause one or more computing devices to configure a network of network devices according to a network configuration defined in the network configuration data. In some embodiments, one or more computing devices implementing network configuration data can be and/or include one or more network devices, such as one or more host devices. In some embodiments, one or more computing devices implementing network configuration data can be and/or include one or more computing devices that are not part of a network to be configured, such as one or more programming computing devices. For instance, one or more programming computing devices can include one or more computing devices that are disposed offboard an autonomous vehicle.

In some embodiments, generating network configuration data can include establishing a target runtime host for each of one or more pods in a network. For instance, one or more computing devices can establish a target runtime host for each of one or more pods in a network. For instance, a target runtime host for each of one or more pods in a network can be established based at least in part on network description data. For instance, one or more computing devices can establish a target runtime host (e.g., a host computing device) for each of one or more pods based on target runtime host computing devices in the network description data for a service and/or group of services (e.g., a group of services that is grouped into a pod).

Additionally and/or alternatively, generating network configuration data can include establishing one or more static communication interfaces for each of one or more pods and/or one or more system devices in a network. For instance, one or more computing devices can establish a static communication interface (e.g., address) for each of one or more pods and/or one or more system devices in a network. For example, in some embodiments, one or more computing devices can assign each pod that has requested network access (e.g., by having an endpoint indication) a network address from a network address subnet on a target runtime host for the pod. As another example, one or more computing devices can assign an address to a system device in a network configuration based on an address associated with the system device in network description data.

Additionally and/or alternatively, generating network configuration data can include establishing one or more communication links. For instance, one or more computing devices can establish one or more communication links within a network. For instance, one or more computing devices can establish one or more communication links between two or more communication interfaces (e.g., static communication interfaces) in a network. For example, one or more computing devices can establish communication links based at least in part on network description data defining requested endpoints and/or allowed accessors for each pod. Additionally and/or alternatively, one or more computing devices can establish communication links based at least in part on network description data defining service and communication interface pairs.

Additionally and/or alternatively, generating network configuration data can include establishing one or more firewall rules. For instance, one or more computing devices can establish one or more firewall rules within the network configuration. For instance, one or more firewall rules can be configured to allow network communications along one or more communication links. Additionally and/or alternatively, one or more firewall rules can be configured to block network communications along some or all connections (e.g., sources and/or destinations, such as source/destination pairs) other than one or more established communication links.

According to example aspects of the present disclosure, one or more computing devices can configure a plurality of network devices (e.g., autonomous vehicle devices) in a network according to a network configuration. For instance, one or more computing devices can implement one or more computer-readable instructions defined by network configuration data to configure one or more network devices in a network. One or more computing devices implementing a network configuration can, for example, define communication links between the network devices, configure services, containers, and/or pods on host computing devices, implement firewall rules at the network devices and/or perform any additional tasks required to make a network including the network devices perform according to the network configuration.

According to example aspects of the present disclosure, a plurality of network devices can be operated in a network configuration to operate an autonomous vehicle system. For instance, a plurality of network devices can be operated in a network configuration such that a firewall including one or more firewall rules allows communications only along established communication links. Additionally and/or alternatively, a plurality of network devices can be operated in a network configuration such that one or more services on the network devices are arranged within any of host computing devices, containers, and/or pods based at least in part on the network configuration.

Systems and methods according to example aspects of the present disclosure can achieve a number of technical effects and benefits. As one example, systems and methods according to example aspects of the present disclosure can achieve improved robustness to changes in external network factors. For example, a network according to example aspects of the present disclosure can define one or more endpoints such that communication with an external network can occur only through those endpoints. As such, impact of changes to the external network on the network can be reduced if the external network continues to properly communicate through the endpoints. As another example, adjusting communication with the external network based on changes to the external network can require less modification to the network, such as by only adjusting one or more endpoints.

As another example, systems and methods according to example aspects of the present disclosure can achieve improved security against internal and external threats. For example, firewall settings for the network can block elements of the network from responding to and/or acknowledging communications from sources that are not pre-authorized to communicate with the elements. This can result in fewer avenues for potential threats to interfere with functionality of the network. As another example, in an instance where a subset of the network, such as a subset of host computing devices, pods, and/or containers on the network, is nonetheless compromised, the threat can be increasingly contained to the compromised subset. For example, because the network is static and defined prior to compilation, the firewall rules can be established at a higher level than the network, and/or can be unmodifiable from within the compromised subset. As such, fewer opportunities are provided for a threat to spread beyond the compromised subset. Additionally and/or alternatively, the impact of the compromised subset on the functionality of the network can be minimized, as the threat cannot communicate or interfere with elements of the network that the compromised subset is not pre-authorized to communicate with. This can result in, for example, fewer or no critical components for autonomous vehicle operation (e.g., sensors, control systems, etc.) being compromised.

Additionally and/or alternatively, systems and methods according to example aspects of the present disclosure can provide for improvements in computing technology. As one example, systems and methods according to example aspects of the present disclosure can allow for improved gating of communications with elements of a network. For example, systems and methods according to example aspects of the present disclosure can facilitate routing of most or all communications with a device (e.g., a sensor) through a single pod and/or container. As such, not only can the improved robustness and/or security be achieved, as described above, but the container can additionally be configured to manage the communications. For example, the container can log traffic to and from the device, which can be useful in determining efficiency of the system. As another example, in some embodiments, a container can implement additional functionality for the device, such as, for example, pre-processing, caching, communication priority, or any other suitable functionality. As another example, a container can provide a degree of abstraction between a device on a network and a remainder of a network. Abstraction can generally be useful when a device is modified, for example during testing, system updates, or other suitable process resulting in modification of the device.

Various means can be configured to perform the methods and processes described herein. For example, a network configuration computing system can include data obtaining unit(s), configuration data generating unit(s), network configuring unit(s), firewall unit(s), autonomous vehicle (AV) control unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods and/or other operations described herein can be implemented as such algorithm(s). For instance, the means (e.g., data obtaining unit(s)) can be configured to obtain network description data associated with a plurality of autonomous vehicle devices of an autonomous vehicle. For example, the plurality of autonomous vehicle devices can be network devices as described herein. A data obtaining unit is one example of a means for obtaining such data as described herein.

The means (e.g., configuration generating unit(s)) can be configured to generate network configuration data based at least in part on the network description data. The means can provide network configuration data as output in response to network description data as input. For example, in some embodiments, the means can be configured to establish one or more pods defined by the network configuration data based at least in part on one or more services defined by the network description data, establish a target runtime host of the one or more host computing devices for each of the one or more pods defined by the network configuration data based at least in part on the network description data, establish one or more static communication interfaces for each of the one or more pods defined by the network configuration data based at least in part on the network description data, establish the one or more communication links between the one or more static communication interfaces based at least in part on the network description data, and establish one or more firewall rules defined by the network configuration data, the one or more firewall rules configured to allow network communications along the one or more communication links and block network communications along some or all connections other than the one or more communication links. A configuration generating unit is one example of a means for generating such network configuration data as described herein.

The means (e.g., network configuring unit(s)) can be configured to configure a plurality of autonomous vehicle devices in the network according to the network configuration data. For example, the means can configure one or more pods on one or more autonomous vehicle devices, one or more containers in each of the one or more pods, one or more communication links configured to provide communications among the plurality of autonomous vehicle devices, and a firewall comprising one or more firewall rules based at least in part on the network configuration data. A configuration implementing unit is one example of a means for implementing a network configuration as described herein.

The means (e.g., firewall unit(s)) can be configured to allow communications along one or more communication links and block communications along some or all links other than the one or more communication links. For instance, the means can include one or more firewall rules configured to allow communications along one or more communication links and block communications along some or all links other than the one or more communication links. A firewall unit is one example of a means for allowing communications along one or more communication links and blocking communications along some or all links other than the one or more communication links as described herein.

The means (e.g., AV control unit(s)) can be configured to generate one or more vehicle control signals for one or more vehicle controls (e.g., actuators or other devices that control gas flow, steering, braking, etc.) for an autonomous vehicle. Additionally and/or alternatively, an AV control unit can be configured to implement the control signals to operate an autonomous vehicle. The means can be configured in a network configuration as described herein. For instance, an AV control unit can be and/or can include one or more network devices. An AV control unit is one example of a means for controlling an autonomous vehicle as described herein.

With reference now to the FIGS., example embodiments of the present disclosure will be discussed in further detail.

FIG. 1 depicts an example system 100 overview according to example implementations of the present disclosure. As illustrated, FIG. 1 shows a system 100 that includes a vehicle 102; an operations computing system 104; one or more remote computing devices 106; a communications network 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 102 and/or its users to coordinate a vehicle service provided by the vehicle 102. To do so, the operations computing system 104 can communicate with the one or more remote computing devices 106 and/or the vehicle 102 via one or more communications networks including the communications network 108. The communications network 108 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including sending and/or receiving data or signals to and from the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108. For example, the one or more remote computing devices 106 can request the location of the vehicle 102 or a state of one or more objects detected by the one or more sensors 114 of the vehicle 102, via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., a latitude and longitude), a velocity, an acceleration, a trajectory, a heading, and/or a path of the vehicle 102 based in part on signals or data exchanged with the vehicle 102. In some implementations, the operations computing system 104 can include the one or more remote computing devices 106.

In addition, or alternatively, the operations computing system 104 and/or the one or more remote computing devices 106 can include and/or otherwise be associated with the one or more training computing devices. By way of example, and as discussed in greater detail with reference to FIG. 10, the one or more training computing devices can be associated with a training computing system that is remote from the vehicle 102. For example, the training computing system can be a component of, or otherwise be associated with, the operations computing system 104 and/or the remote computing devices 106. In some instances, the training system may be local to the vehicle 102. For example, vehicle computing system 112 may include one or more training computing devices. The training computing system can include one or more processors and one or more memory devices. The one or more memory devices of the training computing system can store instructions that when executed by the one or more processors cause the one or more processors to perform operations and/or functions associated with the operation of one or more machine-learned models. For example, the operations can include training the one or more machine-learned models by receiving a rasterized image associated with a training object; generating a predicted trajectory of the training object by inputting the rasterized image into a machine-learned prediction generator model configured to output the predicted trajectory; converting the predicted trajectory into a rasterized trajectory that spatially corresponds to the rasterized image; determining a loss score for the predicted trajectory by inputting the rasterized trajectory and the rasterized image into a machine-learned discriminator model configured to output the loss score for the predicted trajectory; determining an overall loss for the machine-learned prediction generator model based, at least in part, on the loss score; and training the machine-learned prediction generator model by minimizing the overall loss for the machine-learned prediction generator model.

The vehicle 102 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 102 can be an autonomous vehicle that can perform various actions including driving, navigating, and/or operating, with minimal and/or no interaction from a human driver. The vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle 102, the state of one or more passengers of the vehicle 102, and/or the state of an environment external to the vehicle 102 including one or more objects (e.g., the physical dimensions, velocity, acceleration, heading, location, and/or appearance of the one or more objects) can be stored locally in one or more memory devices of the vehicle 102. Furthermore, as discussed above, the vehicle 102 can provide data indicative of the state of the one or more objects (e.g., physical dimensions, velocity, acceleration, heading, location, and/or appearance of the one or more objects) within a predefined distance of the vehicle 102 to the operations computing system 104 and/or the remote computing devices 106, which can store an indication, record, and/or other data indicative of the state of the one or more objects, such as objects within a predefined distance of the vehicle 102, in one or more memory devices associated with the operations computing system 104 and/or the one or more remote computing devices 106 (e.g., remote from the vehicle).

The vehicle 102 can include and/or be associated with the vehicle computing system 112. The vehicle computing system 112 can include one or more computing devices (e.g., network devices) located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 102 (e.g., its computing system, one or more processors, and other devices in the vehicle 102) to perform operations and/or functions, including those described herein for configuring a network of autonomous vehicle devices. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 102 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 102) various parts of the vehicle 102 including a front side, rear side, left side, right side, top, or bottom of the vehicle 102. The sensor data 116 can be indicative of locations associated with the one or more objects within the surrounding environment of the vehicle 102 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing devices 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 102 around the current and/or predicted locations of one or more objects detected by the one or more sensors 114. The autonomy computing system 120 can control the one or more vehicle control systems 138 to operate the vehicle 102 according to the motion plan.

The autonomy computing system 120 can identify one or more objects that are proximate to the vehicle 102 based at least in part on the sensor data 116 and/or the map data 122. For example, the perception system 124 can obtain state data 130 descriptive of a current and/or past state of an object that is proximate to the vehicle 102. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some implementations, the perception and prediction systems 124, 126 (and/or other systems) can be combined into one system and share computing resources.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction generator model. For example, the prediction system 126 can receive state data 130 (e.g., from the perception system 124) associated with one or more objects within the surrounding environment of the vehicle 102. The prediction system 126 can input the state data 130 (e.g., BEV image, LIDAR data, etc.) into the machine-learned prediction generator model to determine trajectories of the one or more objects based on the state data 130 associated with each object. For example, the machine-learned prediction generator model can be previously trained to output a future trajectory (e.g., a future path, one or more future geographic locations, etc.) of an object within a surrounding environment of the vehicle 102. In this manner, the prediction system 126 can determine the future trajectory of the object within the surrounding environment of the vehicle 102 based, at least in part, on the machine-learned prediction generator model.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat). For example, the autonomy computing system 120 can provide one or more outputs including a graphical display of the location of the vehicle 102 on a map of a geographical area within one kilometer of the vehicle 102 including the locations of objects around the vehicle 102. A passenger of the vehicle 102 can interact with the one or more human-machine interfaces 140 by touching a touchscreen display device associated with the one or more human-machine interfaces to indicate, for example, a stopping location for the vehicle 102.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 102. For example, the vehicle computing system 112 can send one or more control signals to activate one or more vehicle systems that can be used to control and/or direct the travel path of the vehicle 102 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 102 (e.g., auditory and/or visual messages about the state or predicted state of objects external to the vehicle 102); braking systems; propulsion systems that can be used to change the acceleration and/or velocity of the vehicle which can include one or more vehicle motor or engine systems (e.g., an engine and/or motor used by the vehicle 102 for locomotion); and/or steering systems that can change the path, course, and/or direction of travel of the vehicle 102.

Figure 2:
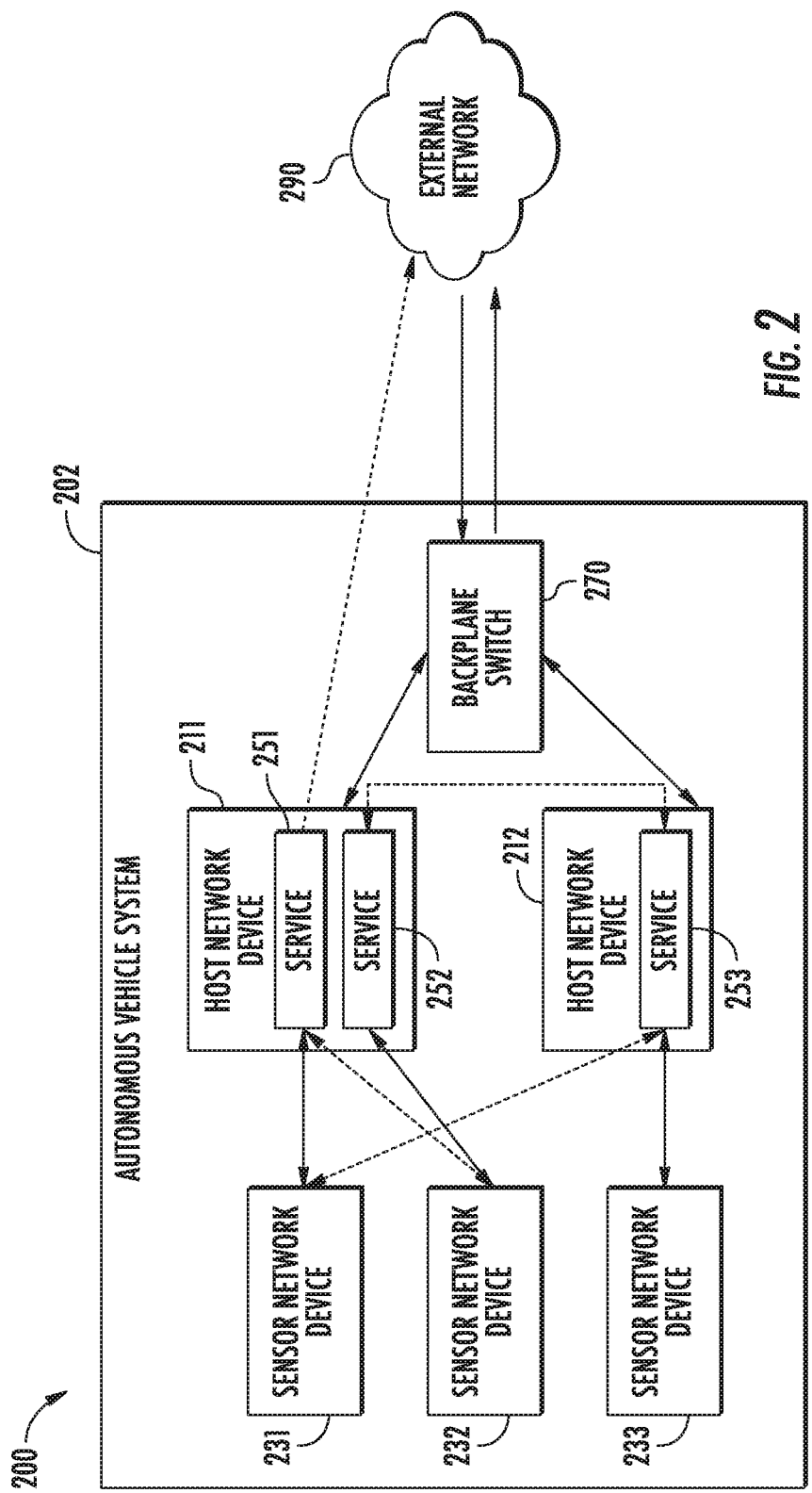
FIG. 2 depicts a block diagram of an example autonomous vehicle network according to example embodiments of the present disclosure.

FIG. 2 depicts an overview 200 of an example autonomous vehicle system 202 with respect to example aspects of the present disclosure. Host network devices (e.g., 211, 212) can be configured to run one or more services (e.g., 251, 252, 253). For instance, autonomous vehicle system 202 can include host network device 211 configured to run at least service 251 and service 252. Autonomous vehicle system can include host network device 212 configured to run at least service 253. One or more services can include, for example, computer-implemented processes for operation of an autonomous vehicle, such as, for example, perception services, inference services, prediction services, planning services, and/or control services, combinations thereof, and/or any other suitable services for operation of an autonomous vehicle. A network configuration can be provided to arrange the one or more services within the network.

According to example aspects of the present disclosure, autonomous vehicle system 202 can include one or more containers. One or more containers can contain one or more services (e.g., services 251, 252, 253). In some embodiments, a container is associated with a single service (e.g., at least one of services 251, 252, 253). One or more containers can provide an operation environment for one or more services (e.g., services 251, 252, 253). Additionally and/or alternatively, one or more containers can monitor and/or restrict communications to and from one or more services (e.g., services 251, 252, 253). In some embodiments, containers can be implemented according to a container protocol, such as, for example, CNI interface and/or CNI plugins.

For instance, a container can provide a virtual operation environment for a service (e.g., services 251, 252, 253). The container can be disposed on a host network device (e.g., host network devices 211, 212) having an amount of computing resources, such as, for example, memory including volatile and/or non-volatile memory, processing power (e.g., operations per second), or other suitable computing resources. The container can provide a virtual operation environment that allows the service to access a set (e.g., a subset) of the computing resources of the host network device. Computing resources other than those provided by the container to the service can additionally and/or alternatively be hidden from the service. Additionally and/or alternatively, the container can provide virtual addresses (e.g., memory addresses) and/or dependencies for the service. In this way, the service can operate dependent only on the resources and/or dependencies of the virtual operation environment within the container, in addition to any communication with external services.

At least host network device 211 and host network device 212, including services 251, 252, 253, can be communicatively coupled by backplane switch 270. Additionally, backplane switch 270 can be configured to control communications between host network devices 211, 212 and external network 290. Service 251 can be communicatively coupled to sensor network device 231. Service 252 can be communicatively coupled to sensor network device 232. Service 253 can be communicatively coupled to sensor network device 233.

As illustrated in FIG. 2, components within autonomous vehicle system 202 can communicate by authorized communications, illustrated by solid arrows. For instance, authorized communications can be defined between host network devices 211, 212, sensor network devices 231, 232, 233, services 251, 252, 253, backplane switch 270, and/or external network 290. For example, authorized communications can correspond to verifiable (e.g., pre-established) communications within autonomous vehicle system 202. Additionally, the autonomous vehicle system 202 can include unauthorized communications, illustrated by dashed arrows. For example, unauthorized communications can deviate from a network map, such as a network map describing intended communication links within a network (e.g., network description data). For example, unauthorized communications can result from scenarios such as compromised devices, errors in coding, shortcuts and/or workarounds, or other suitable scenarios. Generally, it is desirable to prevent occurrence of the unauthorized communications and/or prevent completion of the unauthorized communications if they occur.

Figure 3:
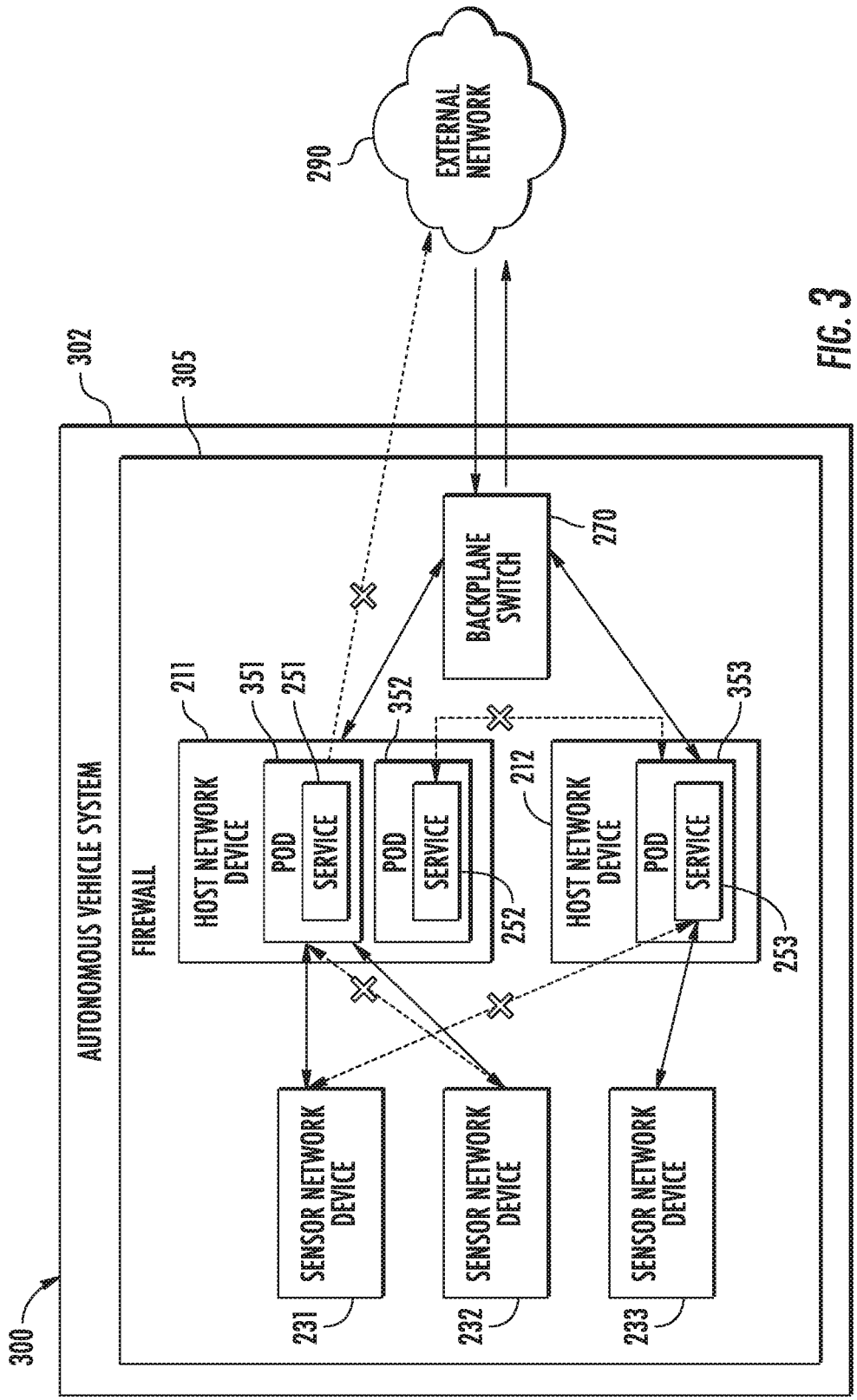
FIG. 3 depicts a block diagram of an example autonomous vehicle network according to example embodiments of the present disclosure.

FIG. 3 depicts an example overview 300 of an autonomous vehicle system 302. including a firewall 305 according to example aspects of the present disclosure. Autonomous vehicle system 302 can include some or all components of autonomous vehicle system 202 such as, for example, host network devices 211, 212, sensor network devices 231, 232, 233, backplane switch 270, and/or external network 290. Additionally, autonomous vehicle system 302 can include pods 351, 352, 353. For instance, pods 351, 352, 353 can encapsulate one or more containers. For instance, pods 351, 352, 353 can each include one or more containers. For instance, in some embodiments, pods 351, 552, 353 can each be configured to run one or more services, such as, for example, services 251, 252, 253 of FIG. 2, and/or other services. Pods 351, 352, 353 can be arranged on host network devices 211, 212. For example, host network devices 211, 212 hosting pods 351, 352, 353 can be in communication to collectively operate an autonomous vehicle based at least in part on one or more containers encapsulated by the pods 351, 352, 353. Pods 351, 352, 353 can be configured to provide communication between one or more containers. For instance, pods 351, 352, 353 can encapsulate one or more containers. Communications between the one or more containers and/or an external element, such as another pod 351, 352, 353, system device (e.g., sensor network devices 231, 232, 233), host network device 211, 212, external network 290, etc., can be provided with respect to the pods 351, 352, 353 (e.g., as opposed to the one or more containers).

Autonomous vehicle system 302 can include one or more communication links, illustrated by solid arrows. For instance, one or more communication links can be defined between pods 351, 352, 353 arranged within autonomous vehicle system 302 corresponding to authorized communications. Additionally and/or alternatively, one or more communication links can be defined between a pod 351, 352, 353 and a system device (e.g., sensor network devices 231, 232, 233). Additionally and/or alternatively, one or more communication links can be defined between a pod 351, 352, 353 and external network 290. It should be understood that a communication link can include any suitable element and/or enablement, or collection thereof, definitively and/or abstractly defined, used to facilitate communication over a pre-established path between network devices. For instance, a communication link can be or include any element or portion of an element used to facilitate communications among network devices in and/or external to autonomous vehicle system 302, such as, but not limited to, routing table entries, firewall entries, physical connections (e.g., a wire), successfully executed handshake and/or acknowledgement protocols, and/or any other suitable indication and/or method for facilitating communications among network devices, and/or combination thereof. As used herein, a "communication" can refer to one or more instances of any of wired and/or wireless analog and/or digital communication within a computer medium. For instance, a communication can be or include at least a portion computer-readable data transmitted according to any of a number of wired and/or wireless communication protocols, such as, but not limited to, Ethernet protocols, LAN protocols (e.g., IEEE 802.11), LTE, TCP, UDP, or any other suitable protocol.

Autonomous vehicle system 302 can include one or more communication interfaces. A communication interface can be configurable to establish a communication link between a pod 351, 352, 353 and external network device. For instance, an external network device can be, but is not limited to, another pod, such as another pod in the same host network device 211, 212 and/or a different host network device 211, 212 from the pod, another type of network device, such as, for example, switch (e.g., a backplane switch 270), a system device (e.g., a sensor and/or control device, such as sensor network devices 231, 232, 233), external network 290 (e.g., one or more offboard network devices) or any other suitable external network device. In some embodiments, for example, a communication interface can include an address, such as a network address, (e.g., MAC address, IP address), port, socket, plug configured to receive a wired connection, and/or any other suitable communication interface, and/or combination thereof. In some embodiments, a communication interface can be implemented as software (e.g., a virtual address). As another example, a communication interface can be or include hardware components (e.g., a wired connection interface).

Autonomous vehicle system 302 device can have one or more network addresses associated with the network device. For instance, host network devices 211, 212 can include one or more associated network addresses, such as one or more subnet addresses used to configure a subnet on the host network device 211, 212. Additionally and/or alternatively, a system device can have one or more associated network addresses, such as one or more network addresses used for communication interfaces. In some embodiments, one or more network addresses can be assigned to pods 351, 352, 353 configured on a host network device 211, 212 based at least in part on one or more network addresses associated with the host network device 211, 212. For example, a host network device 211, 212 can have an assigned subset of network addresses, and pods 351, 352, 353 configured on the host network device 211, 212 can have addresses from the assigned subset of network addresses. In some embodiments, one or more network addresses can be associated with one or more communication interfaces. For instance, a host network device 211, 212 can have a first communication interface (e.g., a first port) and a second communication interface (e.g., a second port) and a first network address can be associated with the first communication interface while a second network address is associated with the second communication interface. Additionally and/or alternatively, a same network address can be used for some or all communication interfaces associated with a host network device 211, 212.

Autonomous vehicle system 302 can include firewall 305. In some embodiments, firewall 305 can be a distributed firewall. For instance, in some embodiments, at least a portion of a distributed firewall can be enforced at each of one or more network devices. As another example, firewall 305 can be a centralized firewall. For example, a centralized firewall can monitor an entire network coverage area while running at a centralized location, such as, for example, a centralized service or process and/or a centralized host network device. In some embodiments, firewall 305 can be implemented as software. In some embodiments, firewall 305 can be implemented in hardware. In some embodiments, firewall 305 can be at least partially software and/or at least partially hardware.

Firewall 305 can include one or more firewall rules. One or more firewall rules can be configured to allow and/or block select communications within autonomous vehicle system 302. For example, one or more firewall rules can be configured to allow and/or block select communications along one or more communication links, such as one or more communication links established between two or more communication interfaces. For instance, in some embodiments, one or more firewall rules can be configured to allow communications along one or more communication links, such as predefined communication links. Additionally and/or alternatively, one or more firewall rules can be configured to block communications that are not along one or more communication links, such as predefined communication links.

One or more firewall rules can be established at any point in autonomous vehicle system 302. For instance, for autonomous vehicle system 302 including one or more predefined valid communication links, firewall 305 including one or more firewall rules can include one or more firewall rules defining source-destination pairs of communication interfaces to be allowed, wherein the firewall is configured to block communications with a source and/or a destination that do not correspond to the allowed source-destination pairs. As another example, firewall 305 can include one or more firewall rules defined for a particular network device (e.g., host network device 211, 212 and/or sensor network device 231, 232, 233) and/or other network element, such as, for example, pod 351, 352, 353. For example, one or more firewall rules defined for a particular network device can include one or more communication whitelists. For example, one or more firewall rules can include one or more communication whitelists corresponding to a whitelist of allowed sources and/or a whitelist of allowed destinations, which may be different lists and/or the same list. For instance, the one or more communication whitelists can include an exhaustive list of devices and/or communication interfaces that are allowed to send and/or receive communications with the network device. For instance, a communication whitelist can include an exhaustive list of valid communication interfaces, such as, for example, any of addresses (e.g., IP addresses), ports, device names and/or other authentication information, sockets, wired connection, and/or other suitable communication interface data, and/or combination thereof. Firewall 305 can thus be configured to allow a communication only if a communication interface sourcing and/or receiving the communication at least partially, and/or completely, matches an entry on a communication whitelist.

In some embodiments, firewall 305 can reject a communication. As one example, firewall 305 can reject communications corresponding to an unauthorized communication, illustrated by dashed arrows with Xs in FIG. 3. For instance, firewall 305 can reject a communication by preventing propagation of at least a portion of the communication, such as a query from a source and/or a reply from a destination, handshake data, etc., such that either or both of the source and/or destination are unaware if the other received the communication. In some embodiments, firewall 305 can reject any and/or all communications that do not match a whitelisted communication link. In this way, firewall 305 can "shield" autonomous vehicle system 302 from unwanted communications. Additionally, firewall 305 can prevent unwanted communications from being used to determine information about a structure of autonomous vehicle system 302. For example, firewall 305 can prevent attackers from sending communications to learn information corresponding to extant devices (e.g., IP addresses), such as by monitoring which devices respond to the communications at all, even if only by denying the communications. Additionally and/or alternatively, firewall 305 can "force" network devices to comply with a pre-established network configuration, which can be helpful in monitoring and/or optimizing traffic on the network, in addition to ensuring compliance with any system requirements.

As illustrated in FIG. 3, firewall 305 can be configured to block unauthorized communications. For example, firewall 305 can be configured to block unauthorized communications with external network 290 (e.g., communications that are not routed through backplane switch 270). As another example, firewall 305 can be configured to block communications to a sensor network device 231, 232, 233 that are not from an associated pod (e.g., from pod 351 to sensor network device 232 and from sensor network device 231 to pod 353). As illustrated in FIG. 3, a blocked communication can be illustrated by an X shape over a dashed arrow. As illustrated in FIG. 3, firewall 305 can allow communications along pre-established communication links, illustrated by solid arrows.

Figure 4:
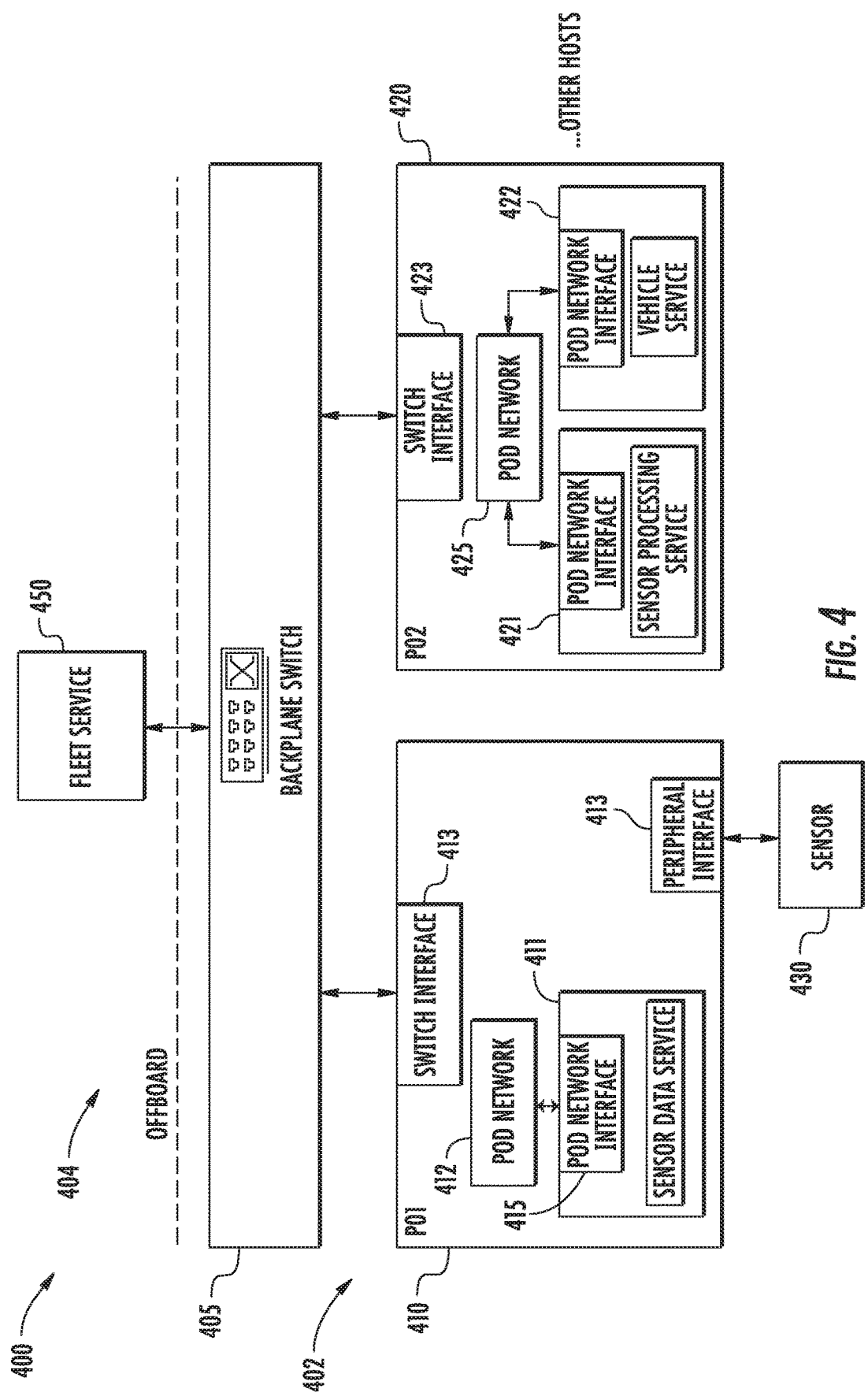
FIG. 4 depicts a network address diagram of an example autonomous vehicle network according to example embodiments of the present disclosure.

FIG. 4 depicts an example network address diagram of an example network configuration 400 according to example aspects of the present disclosure. Network configuration 400 includes onboard devices 402 and offboard devices 404. For instance, onboard devices 402 can be disposed on or inside an autonomous vehicle, and offboard devices 404 can be disposed remote from an autonomous vehicle, such as, for example, at a datacenter. Onboard devices 402, including host network device 410 and/or host network device 420, and/or offboard devices 404, including fleet service 450, can be communicatively coupled by backplane switch 405. In some embodiments, fleet service 450 can include one or more computing devices operable to select and/or remotely communicate with an autonomous vehicle to facilitate operation of the autonomous vehicle, such as operation of the autonomous vehicle within a fleet of autonomous vehicles (e.g., as part of a ride share pod).

Network configuration 400 can include one or more host network devices. For instance, network configuration 400 can include at least host network device 410 and host network device 420. Host network device 410 can implement one or more pods. For example, host network device 410 can implement at least sensor data collection pod 411 that can run a sensor data service. For example, sensor data collection pod 411 can be programmed to (e.g., implement one or more services to) collect data from sensor 430. As another example, host network device 420 can implement sensor processing pod 421 running a sensor processing service and vehicle service pod 422 running a vehicle service. Host network device 410 can include pod network 412. As another example, host network device 420 can include pod network 425. Pod 411 can include communication interface 415. Communication interface 415 can be a pod network communication interface that is configured to facilitate communications between pod 411 and pod network 412, as well as to authorized network devices beyond pod network 412.

Additionally, host network devices 410, 420 can include one or more communication interfaces. For example, host network device 410 can include communication interfaces 413, including a switch interface and a peripheral interface. Each communication interface 413 can have an associated network address and/or identifier. Communication interfaces 413 can be configured to communicatively couple host network device 410, including pod network 412, to backplane switch 405 and/or LIDAR sensor 430. Similarly, host network device 420 can include communication interface 423. Communication interface 423 can include a network address and/or identifier. Communication interfaces 423 can be configured to communicatively couple host network device 420, including pod network 425 and/or pods 421, 422, to backplane switch 405. For instance, if sensor processing pod 421 (e.g., as part of the sensor processing service) is known to require input from sensor 430, one or more firewall rules can be established in network configuration 400 to allow sensor fusion pod 421 to communicate with sensor data collection pod 411, such as through pod network 425, communication interface 423, backplane switch 405, communication interface 413, and/or pod network 412. As another example, if the vehicle service pod 422 is known to require communication with fleet service 450, one or more firewall rules can be established in network configuration 400 to allow vehicle pod 422 to communicate with fleet service 450, such as through pod network 425, communication interface 423, and/or backplane switch 405.

Figure 5:
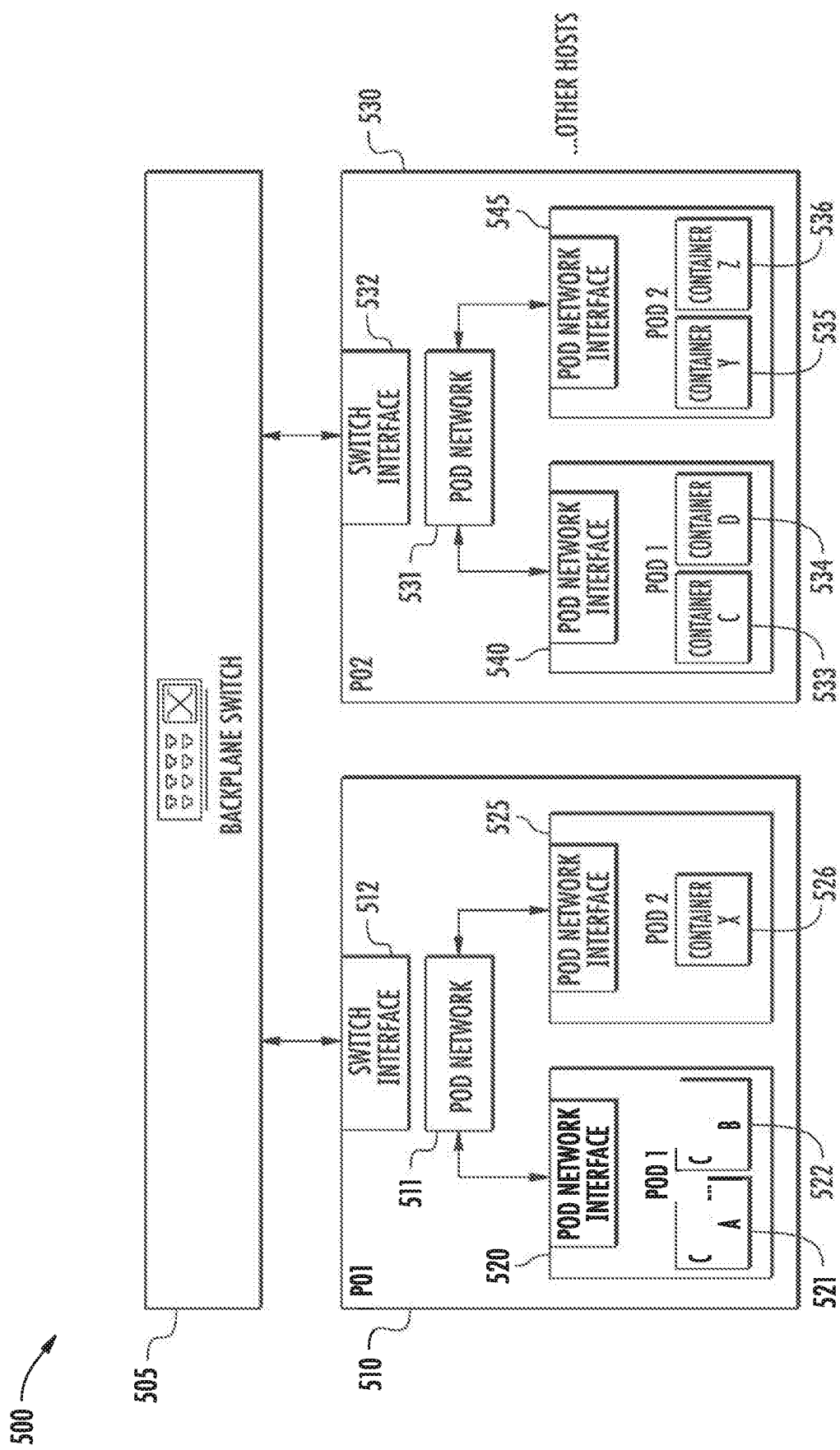
FIG. 5 depicts a network address diagram of an example autonomous vehicle network according to example embodiments of the present disclosure.

FIG. 5 depicts an example network address diagram of an example network configuration 500 according to example aspects of the present disclosure. Network configuration 500 can include one or more host network devices. For instance, network configuration 500 can include at least host network device 510 and host network device 530. Host network device 510 can implement one or more pods. For example, host network device 510 can implement at least first pod 520 and second pod 525. First pod 520 can encapsulate container A 521 and container B 522. Second pod 525 can encapsulate container X 526. First pod 520 and second pod 525 can be communicatively coupled by pod network 511. Host network device 510 can be coupled to backplane switch 505 by communication interface 512. For instance, host network device 510 can be coupled to backplane switch 505 to facilitate communication between host network device 510, including pods 520, 525 and/or containers 521, 522, 526, and other network elements, such as, for example, host network device 530.

As another example, host network device 530 can implement at least third pod 540 and fourth pod 545. Third pod 540 can encapsulate container C 533 and container D 534. Fourth pod 545 can at least encapsulate container Y 535 and container Z 536. Third pod 540 and fourth pod 545 can be communicatively coupled by pod network 531. Host network device 530 can be coupled to backplane switch 505 by communication interface 532. For instance, host network device 530 can be coupled to backplane switch 505 to facilitate communication between host network device 530, including pods 540, 545 and/or containers 533, 534, 535, 536, and other network elements, such as, for example, host network device 510.

Figure 6:
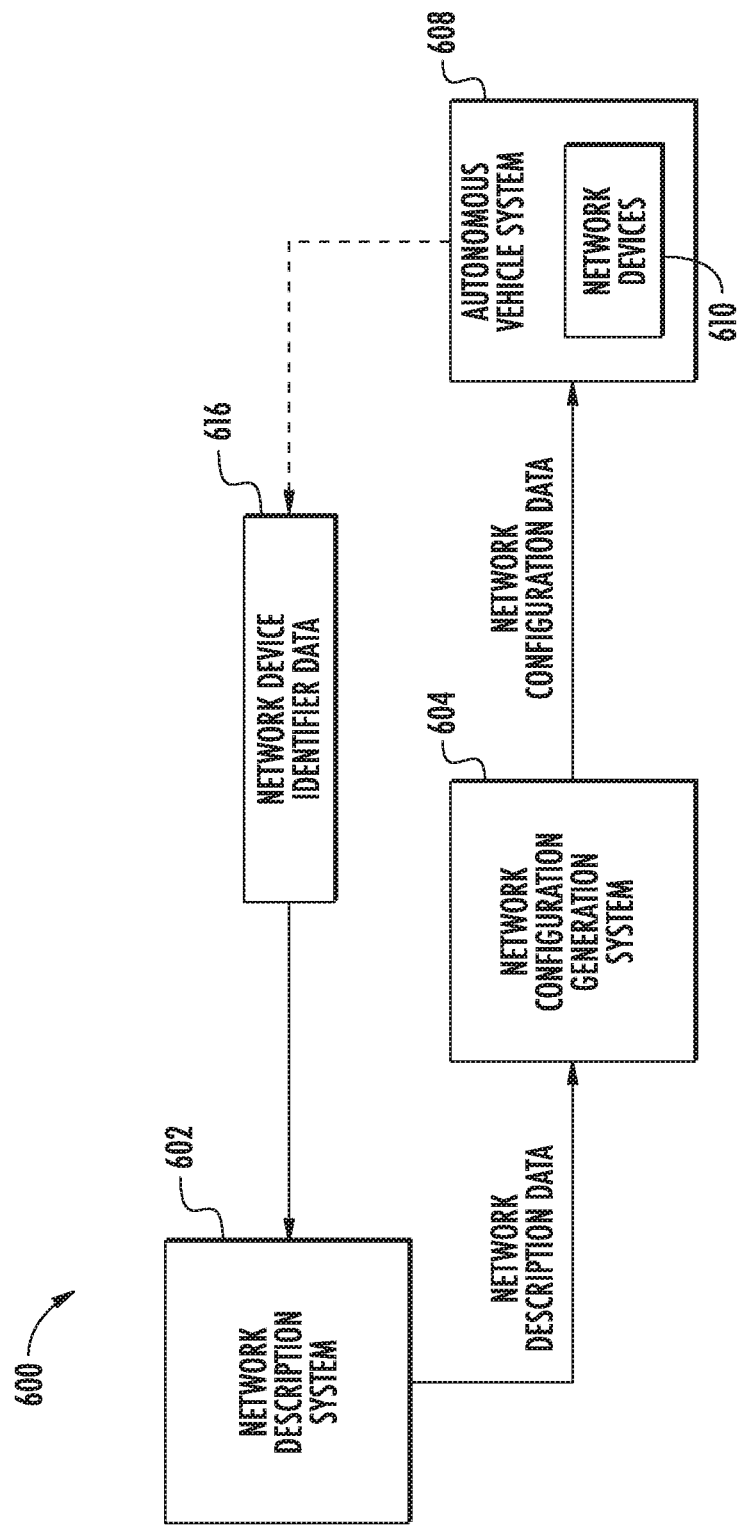
FIG. 6 depicts an example system for configuring a network according to example aspects of the present disclosure.

FIG. 6 depicts an example system 600 for configuring a network according to example aspects of the present disclosure. For instance, system 600 can include network description system 602. Network description system 602 can be configured to receive network device identifier data 616 and, in response to receipt of the network device identifier data 616, provide network description data to network configuration generation system 604. For instance, network device identifier data 616 can include data descriptive of network devices 610 (e.g., in autonomous vehicle system 608) and/or identification of the network devices 610, such as, for example, addresses and/or configuration of the network devices 610. In some embodiments, network device identifier data 616 can be provided by autonomous vehicle system 608 and/or network devices 619. Additionally and/or alternatively, in some embodiments, network device identifier 616 can be provided by a source other than autonomous vehicle system 608, such as, for example, a user, an external computing system, an external memory (e.g., a flash drive, network transmission, etc.) and/or any other suitable source, and/or combination thereof.

In some embodiments, network description data can include data describing network devices 610. In other words, network description data can include data that, informally, describes any system-level information about network devices 610, such as presence and/or arrangement of network devices 610. For instance, network description data can include data describing identification information (e.g., system name, unique identification number, etc.) descriptive of network devices 610.

Additionally and/or alternatively, network description data can include data describing one or more communication interfaces associated with network devices 610. For instance, network description data can include data enumerating network addresses, ports, sockets, etc. associated with network devices 610. For example, network description data can include, for a network device 610, a list of connected devices that are connected to a network device 610, along with any information about addresses or ports used to communicate with the connected devices.

Additionally and/or alternatively, network description data can include data describing one or more network addresses associated with network devices 610. For example, network description data can include data describing a network address associated with a network device 610. As another example, network description data can include data describing a network address subnet associated with a network device 610.

Additionally and/or alternatively, network description data can include data describing one or more external network components. For example, network description data can include data describing one or more offboard services and/or one or more communication interfaces associated with the offboard services. For example, network description data can include a list of offboard services, and, for each of the offboard services, one or more of addresses (e.g., IP addresses), ports, allowed transport methods (e.g., wired, fiber, wireless, cellular communications (e.g., LTE)), or other suitable communication interface data.

Additionally and/or alternatively, network description data can include a skeleton network structure. In some embodiments, communication links in a skeleton network structure can be defined for unidirectional and/or bidirectional communications. Informally, the skeleton network structure can describe requirements of software modules on a network, such as services and/or communication systems, as described more particularly below.

In some embodiments, a skeleton network structure can include a set of services. In addition to and/or alternatively to a set of services, a skeleton network structure can include a set of containers and/or a set of pods. In some embodiments, a set of services and/or a set of containers and/or a set of pods can be defined generally (e.g., in terms of service name and/or ID, as opposed to device-level identifiers). In some embodiments, at least a portion of a set of services and/or a set of containers and/or a set of pods can include target runtime network devices 610 for the portion of the set of services and/or set of containers and/or set of pods. For example, a target runtime network device 610 can specify a network device 610 that a service and/or container and/or pod will preferably and/or be required to run on during operation of a network. In some embodiments, a set of services can include, for each service in the set of services, an endpoint indication defining a service as an endpoint. For instance, an endpoint can be a service which requires communications with services outside of a pod and/or network device 610 associated with the endpoint. For instance, in some embodiments, services and/or containers can be grouped within pods so that endpoint services can communicate with non-endpoint services, which can only require communications within the pod.

In some embodiments, a skeleton network structure can include a set of communication links within a network. For example, a skeleton network structure can include a set of communication links between a set of services and/or a set of network devices 610, such as one or more system devices. For example, a service in a set of services can include a list of requested endpoints (e.g., other services the service needs to communicate with), and communication links (e.g., transmit links) can be defined between the service and each of the requested endpoints. As another example, a service can include a list of allowed accessors (e.g., other services allowed to access the service), and communication links (e.g., receive links) can be defined between the service and each of the allowed accessors. As another example, a service can include a list of communication interfaces, such as ports.

In some embodiments, system 600 can include network configuration generation system 604. Network configuration generation system 604 can be configured to receive network description data from network description system 602 and, in response to receipt of the network description data, provide network configuration data to autonomous vehicle system 608. For example, network configuration data can include one or more sets of computer-readable instructions that, when implemented, cause one or more computing devices to configure a network of network devices 610 according to a network configuration defined in the network configuration data. In some embodiments, one or more computing devices implementing network configuration data (e.g., at the autonomous vehicle system 608) can be and/or include network devices 610. In some embodiments, one or more computing devices implementing network configuration data can be and/or include one or more computing devices that are not part of a network to be configured, such as one or more programming computing devices. For instance, one or more programming computing devices can include one or more computing devices that are disposed offboard an autonomous vehicle.

In some embodiments, network configuration generation system 604 can establish, as described by network configuration data, a target runtime network device 610 for each of one or more pods in a network. For instance, one or more computing devices can establish a target runtime network device 610 for each of one or more pods in a network. For instance, a target runtime network device 610 for each of one or more pods in a network can be established based at least in part on the network description data. For instance, one or more computing devices can establish a target runtime network device 610 (e.g., a host computing device) for each of one or more pods based on target runtime network devices 610 in the network description data for a service and/or group of services (e.g., a group of services that is grouped into a pod).

Additionally and/or alternatively, network configuration generation system 604 can establish, as described by network configuration data, one or more static communication interfaces for each of one or more pods and/or network devices 610 (e.g., system devices) in a network. For instance, one or more computing devices can establish a static communication interface (e.g., address) for each of one or more pods and/or network devices 610 in a network. For example, in some embodiments, one or more computing devices can assign each pod that has requested network access (e.g., by having an endpoint indication) a network address from a network address subnet on a target runtime network device 610 for the pod. As another example, one or more computing devices can assign an address to a network device 610, such as a system device, in a network configuration based on an address associated with the network device 610 in network description data.

Additionally and/or alternatively, network configuration generation system 604 can establish, as described by network configuration data, one or more communication links. For instance, one or more computing devices can establish one or more communication links within a network. For instance, one or more computing devices can establish one or more communication links between two or more communication interfaces (e.g., static communication interfaces) in a network. For example, one or more computing devices can establish communication links based at least in part on network description data defining requested endpoints and/or allowed accessors for each pod. Additionally and/or alternatively, one or more computing devices can establish communication links based at least in part on network description data defining service and communication interface pairs.

Additionally and/or alternatively, network configuration generation system 604 can establish, as described by network configuration data, one or more firewall rules. For instance, one or more computing devices can establish one or more firewall rules within the network configuration. For instance, one or more firewall rules can be configured to allow network communications along one or more communication links. Additionally and/or alternatively, one or more firewall rules can be configured to block network communications along some or all connections (e.g., sources and/or destinations, such as source/destination pairs) other than one or more established communication links.

According to example aspects of the present disclosure, network devices 610 can be configured in a network according to a network configuration described by the network configuration data. For instance, autonomous vehicle system 608 can implement one or more computer-readable instructions defined by network configuration data to configure network devices 610 in a network. Autonomous vehicle system 608 can, for example, define communication links between the network devices 610 and/or external devices, configure services, containers, and/or pods on host computing devices, implement firewall rules at the network devices 610 and/or perform any additional tasks required to make a network including the network devices 610 perform according to the network configuration described by the network configuration data.

According to example aspects of the present disclosure, network devices 610 can be operated in a network configuration to operate autonomous vehicle system 608. For instance, network devices 610 can be operated in a network configuration such that a firewall including one or more firewall rules allows communications only along established communication links. Additionally and/or alternatively, network devices 610 can be operated in a network configuration such that one or more services on the network devices 610 are arranged within any of host computing devices, containers, and/or pods based at least in part on the network configuration.

Figure 7:
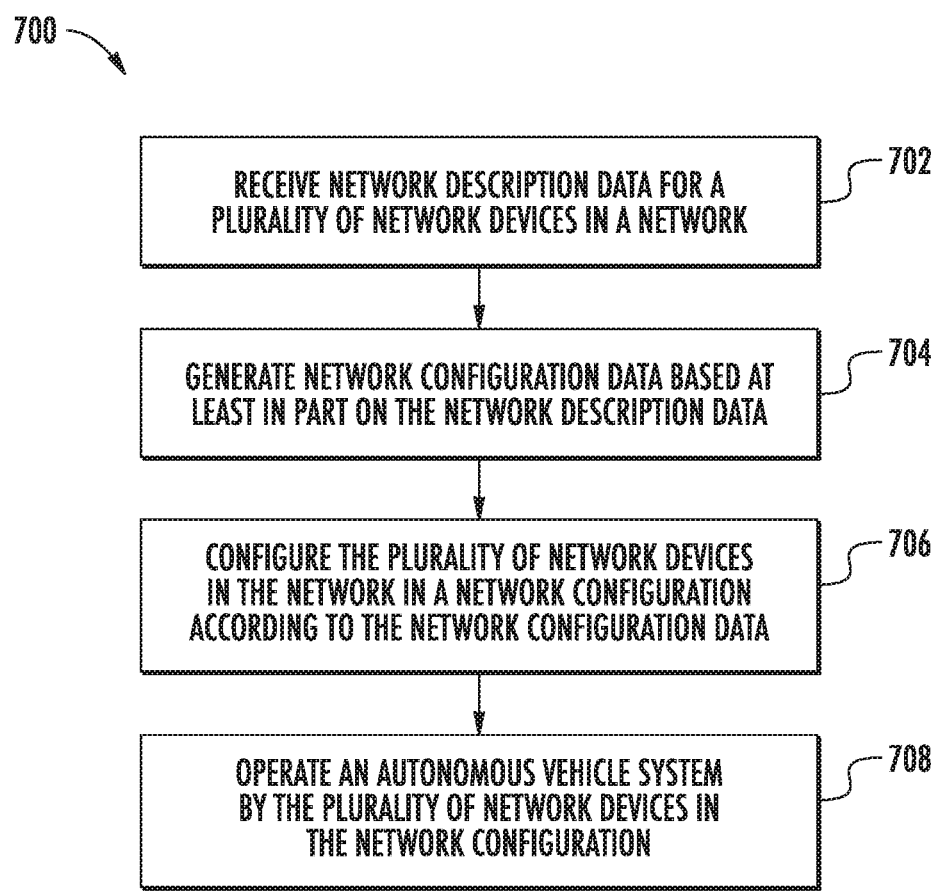
FIG. 7 depicts an example method for configuring a network according to example aspects of the present disclosure.

FIG. 7 depicts a flowchart diagram of an example method of configuring a network according to example implementations of the present disclosure. One or more portion(s) of the method 700 can be implemented by a computing system that includes one or more computing devices such as, for example, the vehicle computing system 112, the training computing system, the operations computing system 104, the one or more remote computing devices 106, etc. Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1-6, 9-10, etc.), for example, to configure one or more network devices in a network configuration.

FIG. 7 depicts elements performed in a particular order for purposes of illustration and discussion. Those of ordinary skill in the art, using the disclosures provided herein, will understand that the elements of any of the methods discussed herein (e.g., method 800 of FIG. 8) can be adapted, rearranged, expanded, omitted, combined, and/or modified in various ways without deviating from the scope of the present disclosure. Methods 700, 800 and other methods described herein may be described with reference to elements/terms described with respect to other systems and figures for exemplary illustrated purposes and is not meant to be limiting. One or more portions of the methods described herein can be performed additionally, or alternatively, by other systems.

At (702), one or more computing systems can receive network description data which is generally descriptive of at least some aspects of a network. In some embodiments, network description data can include data describing one or more network devices, such as one or more host computing devices and/or one or more system devices. In other words, network description data can include data that, informally, describes any system-level information about a network, such as presence and/or arrangement of host computing devices and system devices. For instance, network description data can include data describing identification information (e.g., system name, unique identification number, etc.) associated with one or more network devices, such as one or more host computing devices and/or system devices.

At (704), one or more computing devices can generate network configuration data based at least in part on network description data. For instance, one or more computing devices can generate network configuration data according to the example method of generating network description data illustrated in FIG. 8, and discussed below. Network configuration data can include one or more sets of computer-readable instructions that, when implemented, cause one or more computing devices to configure a network of network devices according to a network configuration defined in the network configuration data. In some embodiments, one or more computing devices implementing network configuration data can be and/or include one or more network devices, such as one or more host devices. In some embodiments, one or more computing devices implementing network configuration data can be and/or include one or more computing devices that are not part of a network to be configured, such as one or more programming computing devices. For instance, one or more programming computing devices can include one or more computing devices that are disposed offboard an autonomous vehicle.

At (706), one or more computing devices can configure a plurality of network devices (e.g., autonomous vehicle devices) in a network according to a network configuration.

For instance, one or more computing devices can implement one or more computer-readable instructions defined by network configuration data to configure one or more network devices in a network. One or more computing devices implementing a network configuration can, for example, define communication links between the network devices, configure services, containers, and/or pods on host computing devices, implement firewall rules at the network devices and/or perform any additional tasks required to make a network including the network devices perform according to the network configuration.

At (708), a plurality of network devices can be operated in a network configuration to operate an autonomous vehicle system. For instance, a plurality of network devices can be operated in a network configuration such that a firewall including one or more firewall rules allows communications only along established communication links. Additionally and/or alternatively, a plurality of network devices can be operated in a network configuration such that one or more services on the network devices are arranged within any of host computing devices, containers, and/or pods based at least in part on the network configuration.

Figure 8:
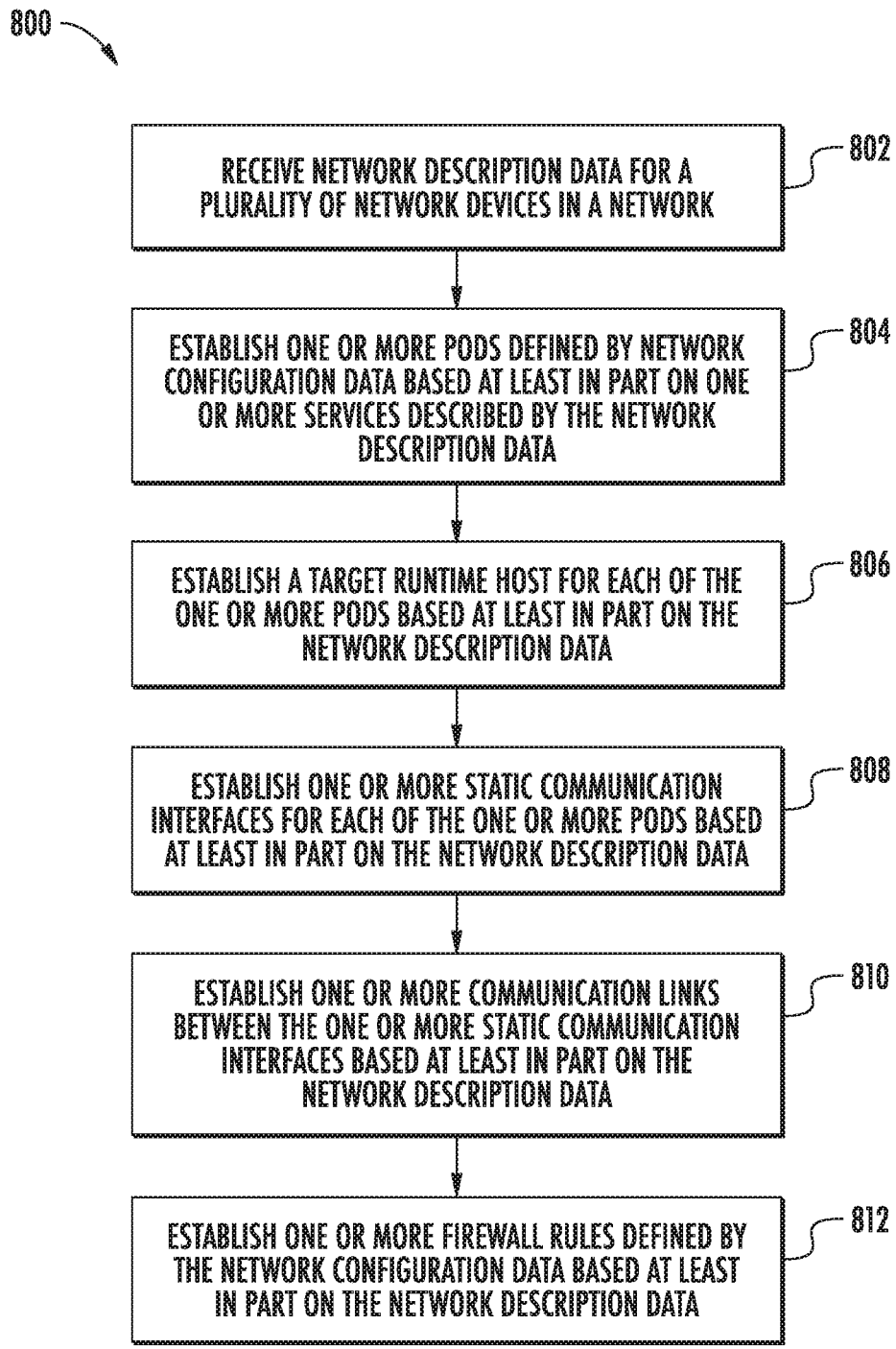
FIG. 8 depicts an example method for generating network configuration data according to example aspects of the present disclosure.
Figure 9:
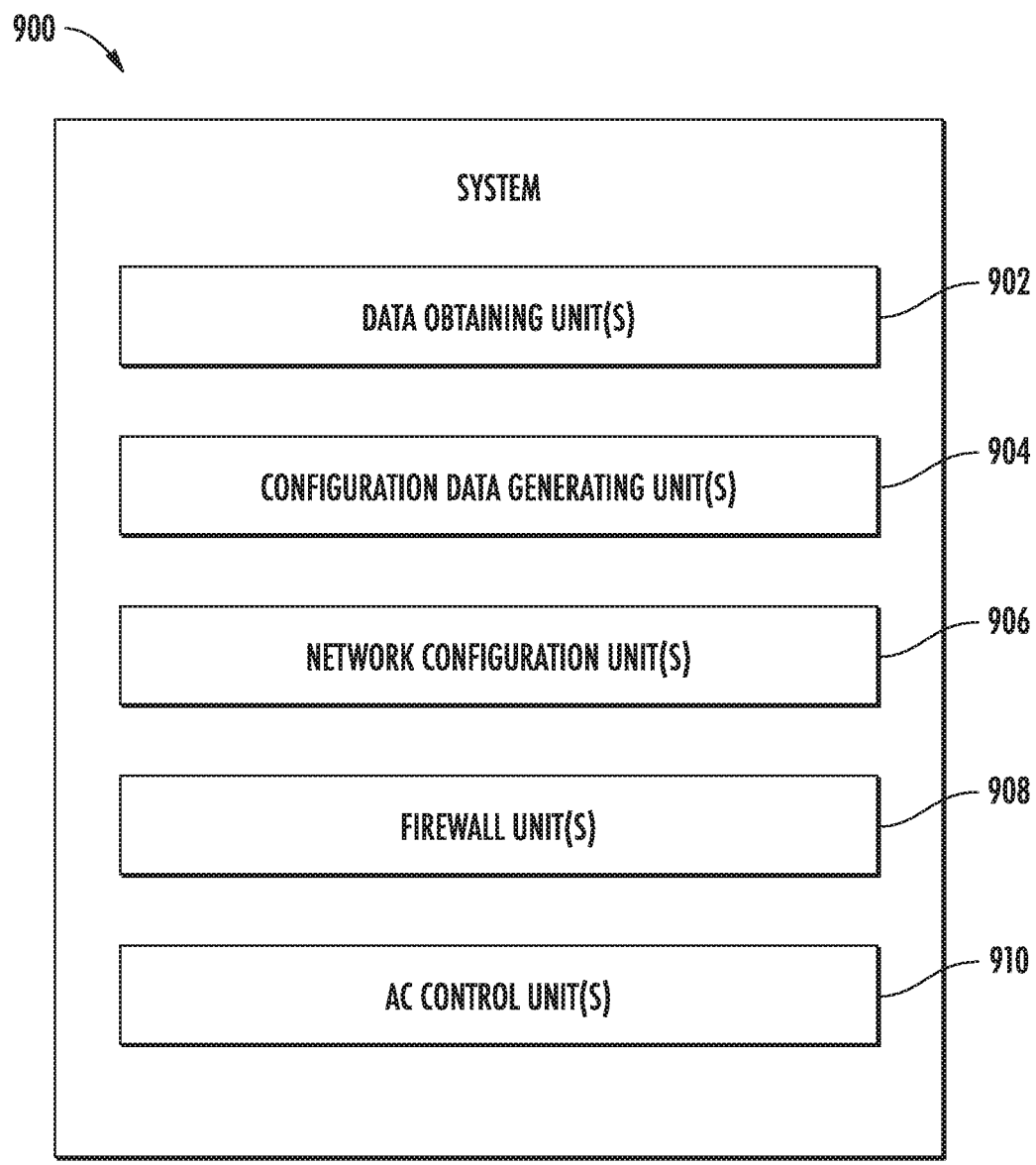
FIG. 9 depicts example system units for performing operations and functions according to example embodiments of the present disclosure.

FIG. 8 depicts a flowchart diagram of an example method of configuring a network, and, in particular, generating network configuration data, according to example implementations of the present disclosure. One or more portion(s) of the method 800 can be implemented by a computing system that includes one or more computing devices such as, for example the vehicle computing system 112, the training computing system, the operations computing system 104, the one or more remote computing devices 106, etc. Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-6, 9-10, etc.), for example, to configure one or more network devices in a network configuration.

At (802), one or more computing systems can receive network description data which is generally descriptive of at least some aspects of a network. In some embodiments, network description data can include data describing one or more network devices, such as one or more host computing devices and/or one or more system devices. In other words, network description data can include data that, informally, describes any system-level information about a network, such as presence and/or arrangement of host computing devices and system devices. For instance, network description data can include data describing identification information (e.g., system name, unique identification number, etc.) associated with one or more network devices, such as one or more host computing devices and/or system devices.

At (804), one or more computing systems can establish one or more pods defined by network configuration data. In some embodiments, the one or more pods can be established based at least in part on one or more services defined by network description data. For instance, in some embodiments, the network description data can specify one or more pods. Additionally and/or alternatively, one or more computing systems can group one or more services into one or more pods encapsulating the one or more services.

At (806), one or more computing systems can establish a target runtime host for each of one or more pods in a network. For instance, one or more computing devices can establish a target runtime host for each of one or more pods in a network. For instance, a target runtime host for each of one or more pods in a network can be established based at least in part on network description data. For instance, one or more computing devices can establish a target runtime host (e.g., a host computing device) for each of one or more pods based on target runtime host computing devices in the network description data for a service and/or group of services (e.g., a group of services that is grouped into a pod).

At (808), one or more computing systems can establish one or more static communication interfaces for each of one or more pods and/or one or more system devices in a network. For instance, one or more computing devices can establish a static communication interface (e.g., address) for each of one or more pods and/or one or more system devices in a network. For example, in some embodiments, one or more computing devices can assign each pod that has requested network access (e.g., by having an endpoint indication) a network address from a network address subnet on a target runtime host for the pod. As another example, one or more computing devices can assign an address to a system device in a network configuration based on an address associated with the system device in network description data.

At (810), one or more computing systems can establish one or more communication links. For instance, one or more computing devices can establish one or more communication links within a network. For instance, one or more computing devices can establish one or more communication links between two or more communication interfaces (e.g., static communication interfaces) in a network. For example, one or more computing devices can establish communication links based at least in part on network description data defining requested endpoints and/or allowed accessors for each pod. Additionally and/or alternatively, one or more computing devices can establish communication links based at least in part on network description data defining service and communication interface pairs.

At (812), one or more computing systems can establish one or more firewall rules. For instance, one or more computing devices can establish one or more firewall rules within the network configuration. For instance, one or more firewall rules can be configured to allow network communications along one or more communication links. Additionally and/or alternatively, one or more firewall rules can be configured to block network communications along some or all connections (e.g., sources and/or destinations, such as source/destination pairs) other than one or more established communication links.

Various means can be configured to perform the methods and processes described herein. For example, a network configuration computing system 900 can include data obtaining unit(s) 902, configuration data generating unit(s) 904, network configuring unit(s) 906, firewall unit(s) 908, autonomous vehicle (AV) control unit(s) 910, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods and/or other operations described herein can be implemented as such algorithm(s). For instance, the means (e.g., data obtaining unit(s) 902) can be configured to obtain network description data associated with a plurality of autonomous vehicle devices of an autonomous vehicle. For example, the plurality of autonomous vehicle devices can be network devices as described herein. A data obtaining unit 902 is one example of a means for obtaining such data as described herein.

The means (e.g., configuration generating unit(s) 904) can be configured to generate network configuration data based at least in part on the network description data. The means can provide network configuration data as output in response to network description data as input. For example, in some embodiments, the means can be configured to establish one or more pods defined by the network configuration data based at least in part on one or more services defined by the network description data, establish a target runtime host of the one or more host computing devices for each of the one or more pods defined by the network configuration data based at least in part on the network description data, establish one or more static communication interfaces for each of the one or more pods defined by the network configuration data based at least in part on the network description data, establish the one or more communication links between the one or more static communication interfaces based at least in part on the network description data, and establish one or more firewall rules defined by the network configuration data, the one or more firewall rules configured to allow network communications along the one or more communication links and block network communications along some or all connections other than the one or more communication links. A configuration generating unit 904 is one example of a means for generating such network configuration data as described herein.

The means (e.g., network configuring unit(s) 906) can be configured to configure a plurality of autonomous vehicle devices in the network according to the network configuration data. For example, the means can configure one or more pods on one or more autonomous vehicle devices, one or more containers in each of the one or more pods, one or more communication links configured to provide communications among the plurality of autonomous vehicle devices, and a firewall comprising one or more firewall rules based at least in part on the network configuration data. A configuration implementing unit 906 is one example of a means for implementing a network configuration as described herein.

The means (e.g., firewall unit(s) 908) can be configured to allow communications along one or more communication links and block communications along some or all links other than the one or more communication links. For instance, the means can include one or more firewall rules configured to allow communications along one or more communication links and block communications along some or all links other than the one or more communication links. A firewall unit 908 is one example of a means for allowing communications along one or more communication links and blocking communications along some or all links other than the one or more communication links as described herein.

The means (e.g., AV control unit(s) 910) can be configured to generate one or more vehicle control signals for one or more vehicle controls (e.g., actuators or other devices that control gas flow, steering, braking, etc.) for an autonomous vehicle. Additionally and/or alternatively, an AV control unit 910 can be configured to implement the control signals to operate an autonomous vehicle. An AV control unit 910 can be configured in a network configuration as described herein. For instance, an AV control unit 910 can be and/or can include one or more network devices. An AV control unit 910 is one example of a means for controlling an autonomous vehicle as described herein.

Figure 10:
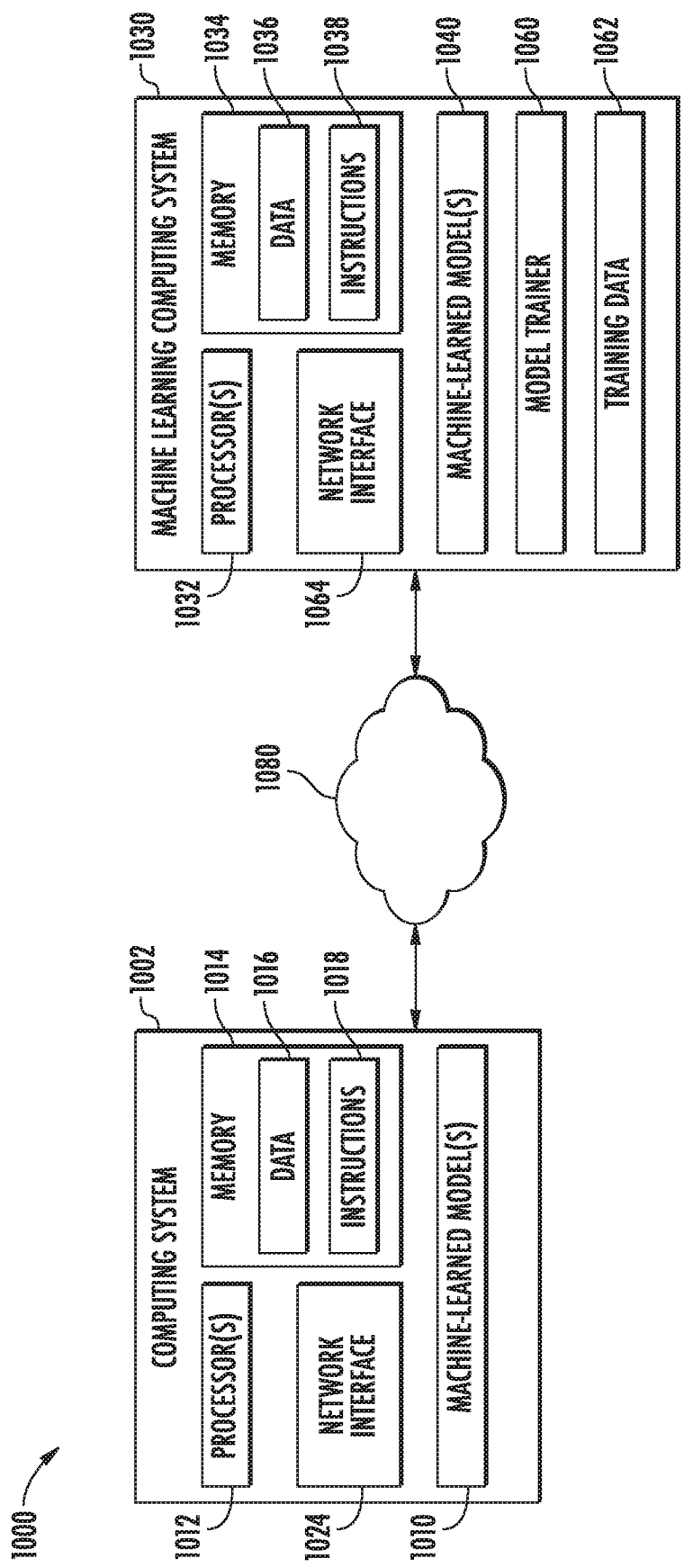
FIG. 10 depicts a block diagram of an example computing system according to example embodiments of the present disclosure.

FIG. 10 depicts example system components of an example system 1000 according to example embodiments of the present disclosure. The example system 1000 can be or include the vehicle computing system 112, the operations computing system 104, etc. that are communicatively coupled over one or more network(s) 1080.

The vehicle computing system 112 can include one or more computing system(s) 1001. The computing system(s) 1002 can include processor(s) 1012 and a memory 1014 (e.g., onboard the vehicle 102). The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processor(s) 1012. For instance, the memory 1014 (e.g., one or more non-transitory computer-readable storage mediums, memory devices) can include computer-readable instructions 1018 that can be executed by the one or more processor(s) 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processor(s) 1012 cause the one or more processor(s) 1012 (e.g., of the computing system 112) to perform operations such as any of the operations and functions of the vehicle computing system 112, the vehicle 102, or for which the vehicle computing system 112 and/or the vehicle 102 are configured, as described herein, the operations for training one or more machine-learned models, receiving/storing state data for one or more object, predicting object trajectories and/or controlling an autonomous vehicle (e.g., one or more portions of method 700/800), and/or any other functions for the vehicle computing system 112, as described herein.

The memory 1014 can store data 1016 that can be obtained, received, accessed, written, manipulated, created, and/or stored. The data 1016 can include, for instance, sensor data, state data, predicted data, data associated with a geographic area, input data, data indicative of machine-learned model(s), data indicative of model outputs, motion planning data, training data and/or other data/information described herein. In some implementations, the computing system(s) 1002 can obtain from and/or store data in one or more memory device(s) that are remote from the vehicle 102 such as one or more memory device of the training computing system.

The computing system(s) 1002 can also include a network interface 1024 used to communicate with one or more other system(s) on-board the vehicle 102 and/or a remote computing device that is remote from the vehicle 102 (e.g., the other systems of FIG. 1, etc.). The network interface 1024 can include any circuits, components, software, etc. for communicating via one or more networks (e.g., 1080). In some implementations, the network interface 1024 can include for example, one or more of a communications controller, receiver, transceiver, transmitter, port, conductors, software and/or hardware for communicating data/information.

The operations computing system 104 can perform the operations and functions for managing vehicles (e.g., a fleet of autonomous vehicles). The operations computing system 104 can be located remotely from the vehicle. For example, the operations computing system 104 can operate offline, off-board, etc. The operations computing system 104 can include one or more distinct physical computing devices.

The operations computing system 104 can include one or more machine-learning computing system(s) 1030. The one or more machine-learning computing system(s) 1030 can include one or more processor(s) 1032 and a memory 1034. The one or more processor(s) 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof.

The memory 1034 can store information that can be accessed by the one or more processor(s) 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, training data such as one or more observations of one or more training objects, data indicative of one or more machine-learned model(s), map data, data associated with a geographic area, and/or other data or information described herein. In some implementations, the operations computing system 104 can obtain data from one or more memory device(s) that are remote from the operations computing system 104.

The memory 1034 can also store computer-readable instructions 1038 that can be executed by the one or more processor(s) 1032. The instructions 1038 can be software written in any suitable programming language or can be implemented in hardware. Additionally, or alternatively, the instructions 1038 can be executed in logically and/or virtually separate threads on processor(s) 1032. For example, the memory 1034 can store instructions 1038 that when executed by the one or more processor(s) 1032 cause the one or more processor(s) 1032 to perform any of the operations and/or functions described herein, including, for example, any of the operations and functions of the operations computing system 104, as well as one or more portions of methods 700, 800, and/or other operations and functions.

The machine-learning computing system(s) 1030 can also include a network interface 1064 used to communicate with one or more other system(s). The network interface 1064 can include any circuits, components, software, etc. for communicating via one or more networks (e.g., 1080). In some implementations, the network interface 1064 can include for example, one or more of a communications controller, receiver, transceiver, transmitter, port, conductors, software and/or hardware for communicating data/information.

According to an aspect of the present disclosure, the vehicle computing system 112 and/or the operations computing system 104 can store or include one or more machine-learned models 1040. As examples, the machine-learned models 1040 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), or other forms of neural networks.

In some implementations, the vehicle computing system 112 and/or the operations computing system 104 can receive one or more of the machine-learned models 1040 from the training computing system 1030 over the network(s) 1080 and can store the one or more machine-learned models 1040 in the memory of the respective system. The vehicle computing system 112 and/or the operations computing system 104 can use or otherwise implement the one or more machine-learned models 1040 (e.g., by processor(s) 1012).

The training computing system 1030 can include one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. In some implementations, the training computing system 1030 can obtain data from one or more memory devices that are remote from the system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032. The memory 1034 can store the instructions 1038 that when executed by the one or more processors 1032 cause the one or more processors 1032 to perform operations. The training computing system 1030 can include a communication system 1039, similar to that of the vehicle computing system 112 and/or the operations computing system 104.

In some implementations, the training computing system 1030 can include one or more server computing devices. If the training computing system 1030 includes multiple server computing devices, such server computing devices can operate according to various computing architectures, including, for example, sequential computing architectures, parallel computing architectures, or some combination thereof.

The network(s) 1080 can be any type of network or combination of networks that allows for communication between devices. In some embodiments, the network(s) 1080 can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 10 illustrates one example system 1000 that can be used to implement the present disclosure. Other computing systems can be used as well. For example, in some implementations, the vehicle computing system 112 and/or the operations computing system 104 can include the model trainer 1060 and the training dataset 1062. In such implementations, the machine-learned models 1040 can be both trained and used locally at the vehicle computing system 112 and/or the operations computing system 104. As another example, in some implementations, the vehicle computing system 112 and/or the operations computing system 104 may not be connected to other computing systems.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. An autonomous vehicle system operable to control an autonomous vehicle, the autonomous vehicle system comprising:
a plurality of network devices arranged in a network according to a network configuration, wherein the plurality of network devices comprises one or more host computing devices and one or more system devices within an autonomous vehicle; and
one or more non-transitory computer-readable media that store instructions for execution to operate the plurality of network devices according to the network configuration;
wherein the network comprises:
a plurality of pods configured to run on the one or more host computing devices;
one or more containers encapsulated by the plurality of pods, wherein the one or more containers respectively provide a virtual operation environment for a service running on a corresponding host computing device of the one or more host computing devices;
one or more communication links configured to provide communications among the plurality of network devices, wherein the one or more communication links comprises one or more intranetwork links configured to provide communication between the plurality of pods; and
a firewall comprising one or more firewall rules, wherein the one or more firewall rules are configured to allow communications along the one or more communication links and block communications along some or all connections other than the one or more communication links.

2. The autonomous vehicle system of claim 1, wherein the one or more communication links and the one or more firewall rules are established prior to compilation of the network and unmodifiable by any of the plurality of network devices during operation of the network.

3. The autonomous vehicle system of claim 1, wherein:
the one or more communication links comprises one or more system device links configured to provide communication between the one or more system devices and one or more containers; and
wherein the one or more system device links are respectively configured to provide communication between at least one of the one or more system devices and one of the one or more containers.

4. The autonomous vehicle system of claim 1, wherein the one or more system devices comprise one or more sensors.

5. The autonomous vehicle system of claim 1, wherein the network comprises at least one respective communication interface for the plurality of pods and the one or more system devices.

6. The autonomous vehicle system of claim 5, wherein the one or more firewall rules comprise a whitelist of valid communication interfaces for the plurality of pods.

7. The autonomous vehicle system of claim 5, wherein the one or more communication links are respectively defined between communication interfaces for two of the plurality of pods.

8. The autonomous vehicle system of claim 1, wherein the one or more communication links comprise one or more internetwork links configured to provide communication between the plurality of pods and one or more external networks, wherein the one or more firewall rules are configured to allow network communications along the one or more internetwork links.

9. The autonomous vehicle system of claim 7, wherein the one or more external networks comprises one or more external computing devices in communication with at least one of the one or more host computing devices.

10. One or more non-transitory computer-readable media that store instructions operable to generate a network configuration for a network comprising a plurality of network devices, the plurality of network devices comprising one or more host computing devices and one or more system devices within an autonomous vehicle, the network further comprising:
- a plurality of pods configured to run on the one or more host computing devices;
- one or more containers encapsulated by the plurality of pods, wherein the one or more containers respectively provide a virtual operation environment for a service running on a corresponding host computing device of the one or more host computing devices;
- one or more communication links configured to provide communication among the plurality of network devices, wherein the one or more communication links comprises one or more intranetwork links configured to provide communication between the plurality of pods; and
- a firewall comprising one or more firewall rules, wherein the one or more firewall rules are configured to allow network communications along the one or more communication links and block network communications along some or all connections other than the one or more communication links.

11. The one or more non-transitory computer-readable media of claim 10, wherein the one or more communication links and the one or more firewall rules are established prior to compilation of the network and unmodifiable by any of the plurality of network devices during operation of the network.

12. The one or more non-transitory computer-readable media of claim 10, wherein:
- the one or more communication links comprises one or more system device links configured to provide communication between the one or more system devices and one or more containers; and
- wherein the one or more system device links are respectively configured to provide communication between at least one of the one or more system devices and one of the one or more containers.

13. The one or more non-transitory computer-readable media of claim 10, wherein the one or more system devices comprise one or more sensors.

14. The one or more non-transitory computer-readable media of claim 10, wherein the network comprises at least one respective communication interface for the plurality of pods and the one or more system devices.

15. The one or more non-transitory computer-readable media of claim 14, wherein the one or more firewall rules comprise a whitelist of valid communication interfaces for the plurality of pods.

16. The one or more non-transitory computer-readable media of claim 14, wherein the one or more communication links are respectively defined between communication interfaces for two of the plurality of pods.

17. The one or more non-transitory computer-readable media of claim 10, wherein:
- the network comprises one or more internetwork links configured to provide communication between the plurality of pods and one or more external networks;
- wherein the one or more firewall rules are configured to allow network communications along the one or more internetwork links.

18. A computer-implemented method for configuring a network comprising a plurality of autonomous vehicle devices configured to operate an autonomous vehicle, the method comprising:
- obtaining network description data for the plurality of autonomous vehicle devices;
- generating network configuration data based at least in part on the network description data; and
- configuring the plurality of autonomous vehicle devices in the network according to the network configuration data,
- wherein the network configuration data defines:
  - one or more pods configured to run on one or more host computing devices;
  - one or more containers encapsulated by the one or more pods, wherein the one or more containers respectively provide a virtual operation environment for a service running on a corresponding host computing device of the one or more host computing devices;
  - one or more communication links configured to provide communications among the plurality of autonomous vehicle devices, wherein the one or more communication links comprises one or more intranetwork links configured to provide communication between the one or more pods; and
  - a firewall comprising one or more firewall rules, wherein the one or more firewall rules are configured to allow communications along the one or more communication links and block communications along some or all links other than the one or more communication links.

19. The computer-implemented method of claim 18, wherein, after the network is configured according to the network configuration, the one or more communication links and the one or more firewall rules are unmodifiable by any of the plurality of autonomous vehicle devices.

20. The computer-implemented method of claim 18, wherein generating network configuration data based at least in part on the network description data comprises:
- establishing the one or more pods defined by the network configuration data based at least in part on one or more services defined by the network description data;
- establishing a target runtime host of the one or more host computing devices for each of the one or more pods defined by the network configuration data based at least in part on the network description data;
- establishing one or more static communication interfaces for each of the one or more pods defined by the network configuration data based at least in part on the network description data;
- establishing the one or more communication links between the one or more static communication interfaces based at least in part on the network description data; and
- establishing the one or more firewall rules defined by the network configuration data, the one or more firewall rules configured to allow network communications along the one or more communication links and block network communications along some or all connections other than the one or more communication links.

* * * * *